(12) United States Patent
Li

(10) Patent No.: US 12,549,745 B2
(45) Date of Patent: Feb. 10, 2026

(54) DATA PROCESSING METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventor: Zhicheng Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 176 days.

(21) Appl. No.: 18/450,627

(22) Filed: Aug. 16, 2023

(65) Prior Publication Data

US 2023/0396783 A1 Dec. 7, 2023

Related U.S. Application Data

(63) Continuation of application No. PCT/CN2022/128561, filed on Oct. 31, 2022.

(30) Foreign Application Priority Data

Nov. 2, 2021 (CN) .......................... 202111288823.5
Dec. 29, 2021 (CN) .......................... 202111640485.7

(51) Int. Cl.
*H04N 19/30* (2014.01)
*G06V 10/74* (2022.01)
(Continued)

(52) U.S. Cl.
CPC ........... *H04N 19/30* (2014.11); *G06V 10/761* (2022.01); *H04N 19/154* (2014.11); *H04N 19/172* (2014.11)

(58) Field of Classification Search
CPC .............................. H04N 19/00; H04N 19/30
See application file for complete search history.

(56) References Cited

U.S. PATENT DOCUMENTS 10,686,859 B2 6/2020 Srikantam et al.
2018/0343468 A1* 11/2018 Harrell ................. H04N 19/157
(Continued)

FOREIGN PATENT DOCUMENTS

CN 107846605 A 3/2018
CN 110087142 A 8/2019
(Continued)

OTHER PUBLICATIONS

The World Intellectual Property Organization (WIPO) International Search Report for PCT/CN2022/128561 Jan. 9, 2023 5 Pages (including translation).

*Primary Examiner* — Kyle M Lotfi
(74) *Attorney, Agent, or Firm* — Anova Law Group, PLLC

(57) ABSTRACT

A data processing method includes: obtaining media data and a first service scenario type to which the media data belongs; obtaining, according to mapping relationships between at least two coding configuration templates in a configuration template set and at least two service scenario types, a first coding configuration template corresponding to the first service scenario type; determining a frame coding parameter of the media data according to the first coding configuration template; and coding the media data according to the determined frame coding parameter to obtain first media data.

20 Claims, 7 Drawing Sheets

(51) Int. Cl.
*H04N 19/154* (2014.01)
*H04N 19/172* (2014.01)

(56) References Cited

U.S. PATENT DOCUMENTS

2020/0077109 A1\* 3/2020 Horowitz ............... G06V 20/46
2020/0204806 A1\* 6/2020 Jin ...................... H04N 19/132

FOREIGN PATENT DOCUMENTS

| CN | 112543328 A | 3/2021 |
| CN | 112738511 A | 4/2021 |

\* cited by examiner

DATA PROCESSING METHOD AND APPARATUS, DEVICE, AND READABLE STORAGE MEDIUM

CROSS-REFERENCES TO RELATED APPLICATIONS

This application is a continuation application of PCT Patent Application No. PCT/CN2022/128561, entitled "DATA PROCESSING METHOD AND APPARATUS, DEVICE, READABLE STORAGE MEDIUM, AND PROGRAM PRODUCT" and filed on Oct. 31, 2022, which claims the priority of Chinese patent application No. 202111288823.5, filed on Nov. 2, 2021 with the China National Intellectual Property Administration and entitled "DATA PROCESSING METHOD AND APPARATUS, DEVICE, and READABLE STORAGE MEDIUM", and the priority of Chinese patent application No. 202111640485.7, filed on Dec. 29, 2021 with the China National Intellectual Property Administration and entitled "DATA PROCESSING METHOD AND APPARATUS, DEVICE, and READABLE STORAGE MEDIUM", the entire contents of all of which are incorporated herein by reference.

FIELD OF THE TECHNOLOGY

The present disclosure relates to the field of computer technologies, and in particular, to a data processing method and apparatus, a device, a readable storage medium, and a program product.

BACKGROUND

With the rapid development of mobile Internets and multimedia technologies, watching multimedia data (such as videos, music, and text) has gradually become a daily form of entertainment. For the same piece of multimedia data, corresponding coding can be performed according to different coding processes to obtain media data with different media qualities. For example, different coding processes can output media data with different code rates (or resolutions).

At present, coding of different multimedia data may only use the same fixed coding parameters. Due to the different quality requirements of different pieces of multimedia data, this method greatly affects the coding effect of the media data, and the coding performance is not high.

SUMMARY

Embodiments of the present disclosure provide a data processing method and apparatus, a device, a readable storage medium, and a program product, which are helpful to improving the coding efficiency and improving the code compression performance.

In one aspect, the embodiments of the present disclosure provide a data processing method, performed in a computer device and includes: obtaining media data and a first service scenario type to which the media data belongs; obtaining, according to mapping relationships between at least two coding configuration templates in a configuration template set and at least two service scenario types, a first coding configuration template corresponding to the first service scenario type; determining a frame coding parameter of the media data according to the first coding configuration template; and coding the media data according to the determined frame coding parameter to obtain first media data.

In one aspect, the embodiments of the present disclosure provide a data processing apparatus, including: a data obtaining module, configured to obtain media data and a first service scenario type to which the media data belongs; a template obtaining module, configured to obtain, according to mapping relationships between at least two coding configuration templates in a configuration template set and at least two service scenario types, a first coding configuration template corresponding to the first service scenario type; a parameter determining module, configured to determine a frame coding parameter of the media data according to the first coding configuration template; and a data coding module, configured to code the media data according to the determined frame coding parameter to obtain first media data.

In one aspect, the embodiments of the present disclosure provide a computer device, including: at least one processor and at least one memory, the at least one memory storing a computer program which, when executed by the at least one processor, causes the at least one processor to implement the method in the embodiments of the present disclosure.

In one aspect, the embodiments of the present disclosure provide a non-transitory computer-readable storage medium. The computer-readable storage medium stores a computer program. The computer program includes program instructions. The program instructions, when executed by a processor, implement the method in the embodiments of the present disclosure.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are some embodiments of the present invention.

DESCRIPTION OF EMBODIMENTS

The technical schemes in the embodiments of the present disclosure will be clearly and completely described below with reference to the drawings in the embodiments of the present disclosure, and it is obvious that the described embodiments are only a part of the embodiments of the present disclosure, but not all of them. Based on the embodiments of the present disclosure, all other embodiments obtained by those ordinarily skilled in the art without creative effort shall fall within the protection scope of the present disclosure.

Figure 1:
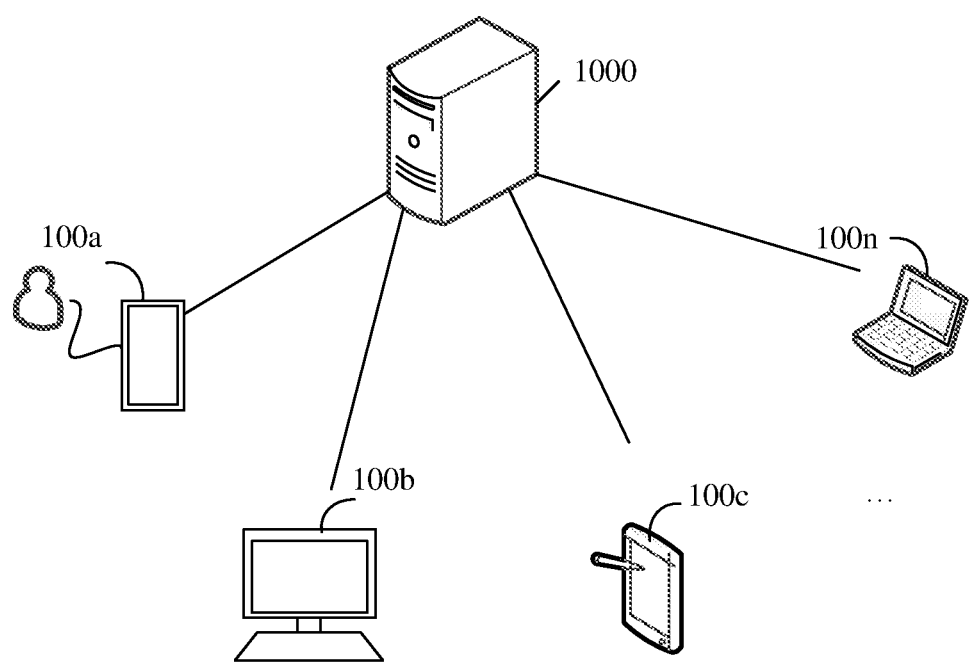
FIG. 1 is a diagram of a network architecture according to an embodiment of the present disclosure.

Referring to FIG. 1, FIG. 1 is a schematic structural diagram of a network architecture according to an embodiment of the present disclosure. As shown in FIG. 1, the network architecture may include a service server 1000 and a terminal device cluster (namely, a user terminal cluster). The terminal device cluster may include one or more terminal devices, and there will be no limitation on a quantity of terminal devices here. As shown in FIG. 1, a plurality of terminal devices may specifically include terminal device 100a, terminal device 100b, terminal device 100c, . . . , and terminal device 100n. As shown in FIG. 1, terminal device 100a, terminal device 100b, terminal device 100c, . . . , and terminal device 100n may be respectively connected to the above-mentioned service server 1000 through a network, so that each terminal device may perform data interaction with the service server 1000 through the network connection. The network connection here is not limited to a connection manner. It may be directly or indirectly connected through wired communication, or directly or indirectly connected through wireless communication, or connected in other ways. The present disclosure does not make any limitations.

Each terminal device may be integrated with a target application. When the target application is run in each terminal device, the target application can perform data interaction with the service server 1000 shown in FIG. 1 above. The target application may include applications with a function of displaying data information such as texts, images, audios, and videos. The application may include a social application, a multimedia application (for example, a video application), an entertainment application (for example, a game application), an educational application, a live streaming application, and other applications with a media data coding function (for example, a video coding function). Of course, the application may also be other applications with data information display and video coding functions, which will not be illustrated one by one. The application may be an independent application or an embedded sub-application integrated into a certain application (for example, the social application, the educational application, and the multimedia application), without limitation.

For ease of understanding, this embodiment of the present disclosure may select one user terminal as a target user terminal from the multiple user terminals shown in FIG. 1. For example, this embodiment of the present disclosure may use user terminal 100a shown in FIG. 1 as a target user terminal. The target user terminal may be integrated with a target application with a video coding function. At this time, the target user terminal may achieve data interaction between a service data platform corresponding to the application client and the service server 1000.

It is understood that a computer device (for example, user terminal 100a, and the service server 1000) with a media data coding function (for example, a video coding function) in this embodiment of the present disclosure may achieve data coding and data transmission of multimedia data (for example, video data) through a cloud technology. A cloud technology is a hosting technology for unifying a series of resources such as hardware, software, and networks in a wide area network or a local area network to achieve computation, storage, processing and sharing of data.

The cloud technology is a general name of a network technology, an information technology, an integration technology, a management platform technology, an application technology and the like, can form a resource pool for on-demand use, and is flexible and convenient. A cloud computing technology will become an important support. Background services of a technical network system require a large amount of computing and storage resources, such as video websites, image websites and more portal websites. With the high development and application of the Internet industry, each article may have an own identification mark which needs to be transmitted to a background system for logic processing. Data of different levels will be processed separately, and various kinds of industry data need a strong system backing support, which can be achieved only through cloud computing.

For example, the data processing method provided in the embodiments of the present disclosure can be applied to high resolution and high frame rate scenarios such as video watching, video calls, video transmission, cloud conferencing, and live streaming. Cloud conferencing is an efficient, convenient, and low-cost conference format based on a cloud computing technology. At present, cloud conference in China mainly focuses on service contents taking a Software as a Service (SaaS) model as a main body, including telephones, networks, videos, and other service forms. Cloud computation-based video conferencing is referred to as cloud conferencing. A cloud conference system supports dynamic cluster deployment of multiple servers and provides multiple high-performance servers, which greatly improves the stability, security, and availability of conferences. In recent years, thanks to its effects of greatly improving the communication efficiency, continuously reducing the communication cost, upgrading the internal management level, video conferencing has been widely used in various fields such as traffic, transportation, finance, operators, education, and enterprises. Undoubtedly, the use of cloud computing in video conferencing will have a stronger attraction in terms of convenience, quickness, and ease of use, which will undoubtedly stimulate the arrival of a new wave of video conferencing applications.

It is understood that the computer device (for example, user terminal 100a with the video coding function) with the media data coding function can code media data through a media data encoder (for example, a video encoder) to obtain a data code stream corresponding to the media data (for example, to obtain a video code stream corresponding to video data), thereby improving the transmission efficiency of the media data. When the media data encoder is a video encoder, the video encoder may be an AV1 video encoder, an H.266 video encoder, an AVS3 video encoder, and the like, which will not be illustrated one by one. A video compression standard of the AV1 video encoder is a first-generation video coding standard developed by the Alliance for Open Media (AOM).

In this embodiment of the present disclosure, media data to be subjected to coding processing can be referred to as to-be-coded media data, and a service scenario type to which the to-be-coded media data belongs can be referred to as a first service scenario type. It can be understood that in order to improve the coding efficiency and code compression performance of the media data, the present disclosure can configure different coding configuration templates for different service scenario types. If the first service scenario type is different, the first coding configuration template corresponding to the to-be-coded media data will also be different, and its corresponding frame coding parameter will also be different during coding of the to-be-coded media data. In the present disclosure, when the service server 1000 obtains the to-be-coded media data, the service server may code the to-be-coded media data (for example, code the to-be-coded media data through the media data encoder) to obtain first media data. Before coding, the service server 1000 can determine a corresponding first coding configuration template on the basis of the first service scenario type of the to-be-coded media data, determine a corresponding frame coding parameter on the basis of the first coding configuration template, and codes the to-be-coded media data on the basis of the frame coding parameter, thereby obtaining first media data with first media quality (the first media quality has adaptability to the first service scenario type). A specific implementation of determining the first coding configuration template on the basis of the first service scenario type and determining the frame coding parameter of the to-be-coded media data according to the first coding configuration template may refer to descriptions of embodiments corresponding to subsequent FIG. 3.

It is understood that the method provided in the embodiments of the present disclosure can be executed by a computer device. The computer device includes, but is not limited to, a terminal device or a service server. The service server may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms.

In some embodiments, it can be understood that the above computer device (for example, the service server 1000, terminal device 100a, and terminal device 100b) can be a node in a distributed system. The distributed system may be a block chain system. The block chain system may be a distributed system formed by connecting multiple nodes through network communication. A Peer To Peer (P2P) network can be formed between nodes. A P2P protocol is an application layer protocol run on a Transmission Control Protocol (TCP). In the distributed system, any form of computer device, such as a service server, a terminal device, and other electronic devices, can become a node in the block chain system by joining the P2P network. For ease of understanding, the following will explain the concept of block chain: A block chain is a new-type application mode of a computer technology such as distributed data storage, peer-to-peer transmission, a consensus mechanism, and an encryption algorithm. It is mainly used for organizing data in a chronological order and encrypting the data into ledgers, so that the data cannot be tampered and forged, but can be verified, stored and updated. When the computer device is a block chain node, due to the tamper-proof and anti-counterfeiting characteristics of the block chain, data (for example, the to-be-coded media data, the first media data after coding processing, and the frame coding parameter) in the present disclosure can have authenticity and security, thus causing results obtained after relevant data processing based on these data to be more reliable.

Figure 2:
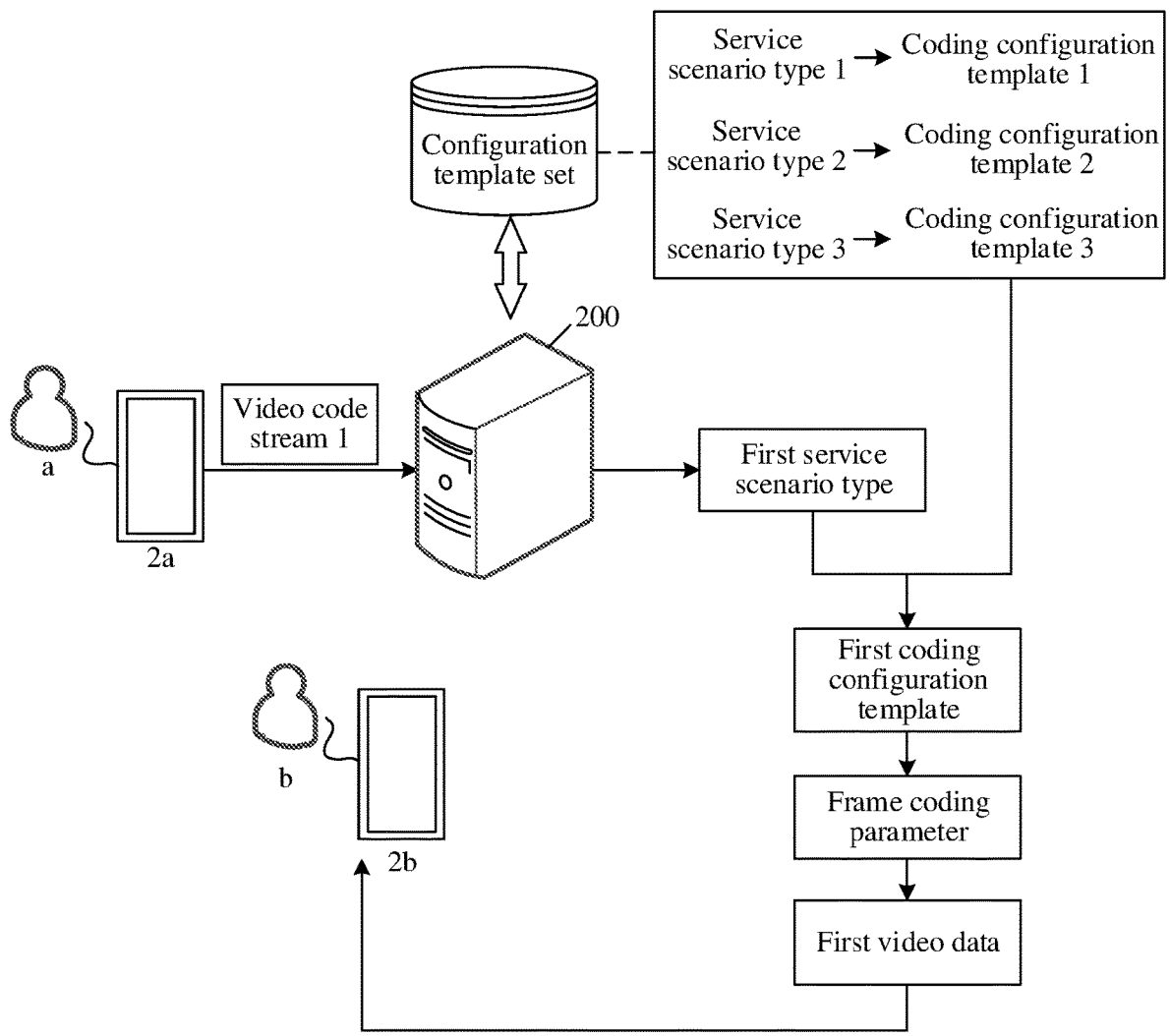
FIG. 2 is a schematic diagram of a scenario of data coding according to an embodiment of the present disclosure.

The embodiments of the present disclosure may be applied to a variety of scenarios including, but not limited to, a cloud technology, artificial intelligence, intelligent transportation, assisted driving, etc. For ease of understanding, referring to FIG. 2, FIG. 2 is a schematic diagram of a scenario of data coding according to an embodiment of the present disclosure. A terminal device 2a may be a transmitting terminal configured to transmit video data (for example, video data 1 shown in FIG. 2). A user corresponding to terminal device 2a may be a user a. A terminal device 2b may be a receiving terminal configured to receive video data (for example, video data 1 shown in FIG. 2). A user corresponding to terminal device 2b may be a user b. A service server 200 shown in FIG. 2 may be a server having a network connection relationship with terminal device 2a. The service server 200 may be the service server 1000 shown in FIG. 1 above.

It is understood that in a video transmission scenario, the terminal device 2a may obtain the video data 1 associated with the user a and acquired by an image acquirer (for example, a camera) (the video data associated with the user a can be obtained only under a permission of the user a). Further, the terminal device 2a may code the video data 1 through a video encoder (for example, an AV1 video encoder) to generate a video code stream 1 associated with the video data 1. At this time, the terminal device 2a may transmit the video code stream 1 to the service server 200. When receiving the video code stream 1, the service server 200 may decode the video code stream 1 to obtain the video data (which can be referred to as YUV video data, decoded video data, or to-be-coded video data) in a pixel image format (also known as a YUV format). Then, the service server 200 may code the to-be-coded video data (for example, code the to-be-coded video data through the video encoder).

For the service server 200, the process of coding the to-be-coded video data may include: The service server 200 may first obtain a service scenario type (which may be referred to as a first service scenario type) to which the to-be-coded video data belongs, that is, may obtain a first service scenario type to which the video data 1 belongs. When the terminal device 2a transmits the video code stream 1 to the service server 1000, the terminal device may also transmit the first service scenario type to which the video data 1 belongs. From this, the service server 200 can quickly and accurately obtain the first service scenario type of the video data 1.

Further, the service server 200 may obtain a configuration template set. The configuration template set may include mapping relationships (one service scenario type may have a mapping relationship with one coding configuration template) between at least two service scenario types and at least two coding configuration templates. The service server 200 may obtain, according to these mapping relationships in the configuration template set, a first coding configuration template corresponding to the first service scenario type. For example, as shown in FIG. 2, the configuration template set includes a mapping relationship between a service scenario type 1 and a coding configuration template 1, a mapping relationship between a service scenario type 2 and a coding configuration template 2, and a mapping relationship between a service scenario type 3 and a coding configuration template 3. If the first service scenario type to which the video data 1 belongs is the service scenario type 2, the service server 200 may take the coding configuration template 2 having the mapping relationship with the service scenario type 2 as the first coding configuration template.

Further, the service server 200 may determine a frame coding parameter of the to-be-coded video data according to the first coding configuration template, and the service server 200 may code the to-be-coded video data according to the frame coding parameter, thereby obtaining first video data with first media quality. The service server 200 may transmit the first video data to the terminal device 2b waiting to play a video. The terminal device 2b may decode and output the first video data. The user b may watch the video data 1 through the terminal device 2b.

It can be understood that the coding of the to-be-coded video data can actually be understood as coding video frames (which can be referred to as to-be-coded video frame) of the to-be-coded video data. The above frame coding parameter may include a frame coding structure and a frame coding quality parameter (such as a code rate, a resolution, and a quantization parameter). The present disclosure may code each to-be-coded video frame according to the frame coding structure and the frame coding quality parameter. It can be understood that during the coding of the to-be-coded video data, video frames (which can be referred to as first video frames) that need to be coded can be obtained from the to-be-coded video data, and a Coding Unit (CU) may be obtained from the first video frames. Further, the service server 200 may predict the coding unit on the basis of a coding policy of the video encoder to obtain an optimal prediction mode corresponding to the coding unit, and then code the coding unit on the basis of the optimal prediction mode and the frame coding parameter mentioned above to obtain a compressed code stream corresponding to the coding unit. It is understood that when the service server 200 completes the coding of each coding unit in the first video frame, the compressed code stream corresponding to each coding unit can be obtained separately, and these compressed code streams can be encapsulated into a video code stream associated with the to-be-coded video data. The video code stream can be referred to as the first video data shown in FIG. 2.

The coding policy here may include an intra-prediction mode and an inter-prediction mode. It can be understood that in the process of determining the optimal prediction mode by the service server 200, the service server 200 may select a prediction mode corresponding to an optimal rate distortion cost from the intra-prediction mode, and then use the selected prediction mode as the optimal intra-prediction mode. Similarly, the service server 200 may select a prediction mode corresponding to the optimal rate distortion cost from the inter-prediction mode, and then use the selected prediction mode as the optimal inter-prediction mode. Further, the service server 200 may perform mode selection on the basis of the rate distortion costs of the optimal intra-prediction mode and the optimal inter-prediction mode to obtain the optimal prediction mode. In other words, the service server 200 may select a prediction mode with a minimum rate distortion cost from the optimal intra-prediction mode and the optimal inter-prediction mode, and can then take the prediction mode with the minimum rate distortion cost as the optimal prediction mode.

It is understood that in order to improve the coding efficiency, the present disclosure can pre-configure a coding configuration template for different service scenario types according to requirements for different service scenarios. The coding configuration template may include a frame coding structure and a frame coding quality parameter of media data (such as video data) under different service scenario types. Therefore, when a certain piece of to-be-coded media data is obtained, the computational complexity in the coding process can be reduced, and the first coding configuration template corresponding to the first service scenario type to which the to-be-coded media data belongs. This can quickly determine the frame coding structure and frame coding quality parameter corresponding to the to-be-coded media data. Then, the to-be-coded media data can be coded according to the frame coding structure and the frame coding quality parameter, which greatly improves the coding efficiency.

In one embodiment, the present disclosure can also adaptively adjust the first coding configuration template according to a network state (or decoding ability) of a decoding end (for example, the terminal device 2b). For example, after the first coding configuration template corresponding to the to-be-coded media data is obtained, the frame coding quality parameter in the first coding configuration template includes the coding quality parameter, namely, a code rate, if the network state corresponding to the terminal device 2b is poor at this time, the code rate can be adaptively reduced, so that the decoding end can still quickly receive the video data even in the poor network state.

Figure 3:
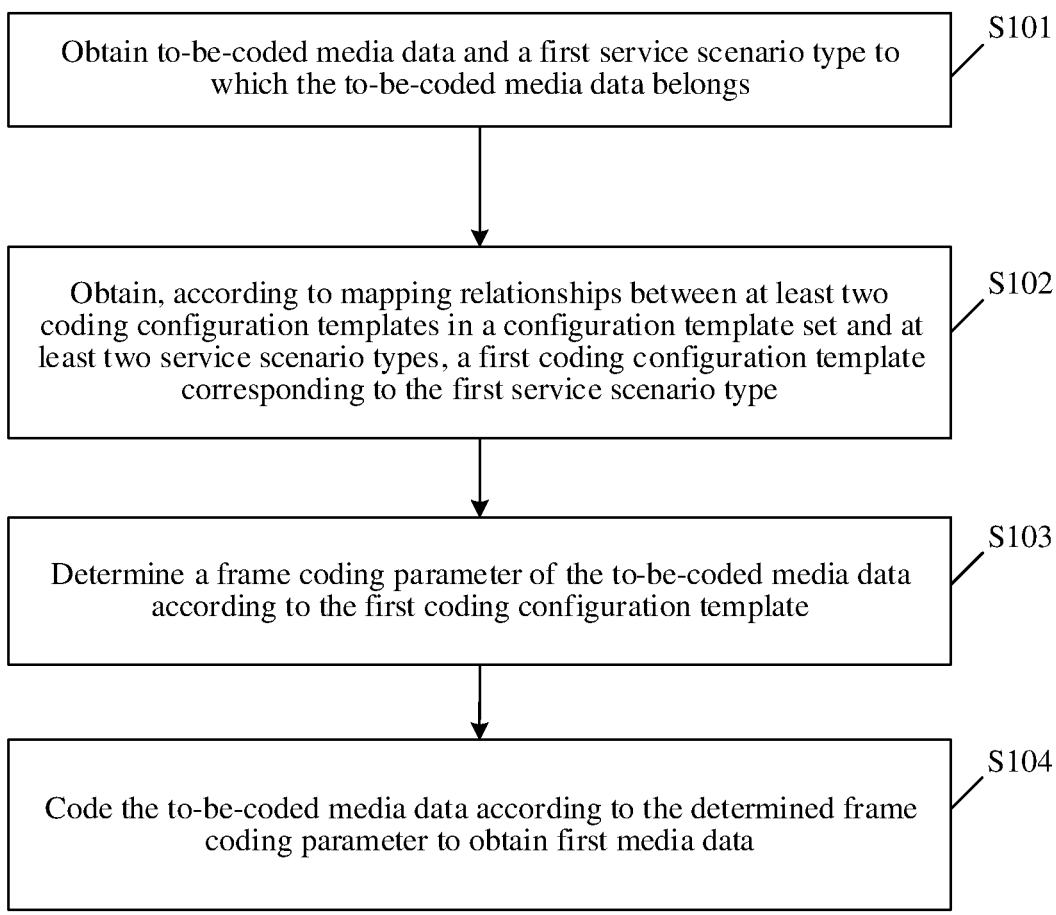
FIG. 3 is a schematic flowchart of a data processing method according to an embodiment of the present disclosure.

Further, referring to FIG. 3, FIG. 3 is a schematic flowchart of a data processing method according to an embodiment of the present disclosure. The method can be performed by a computer device, for example, a terminal device (for example, any terminal device in the terminal device cluster in the corresponding embodiment of FIG. 1 above, such as terminal device 100a). The method can also be performed by a service server (for example, the service server 1000 in the corresponding embodiment of FIG. 1 above). The method may be further performed by the terminal device and the service server together. The method performed by the service server is taken as an example. As shown in FIG. 3, the flow of the method may at least include step S101 to step S104 below:

Step S101: Obtain to-be-coded media data and a first service scenario type to which the to-be-coded media data belongs.

In the present disclosure, a computer device (for example, a terminal device) with a media data coding function (for example, a video coding function) may obtain media data (for example, video data) acquired by an image acquirer (for example, a camera of the terminal device) in a data transmission scenario. Further, the terminal device may code the media data, thereby obtaining a data code stream (for example, a video code stream) corresponding to the media data. The terminal device may transmit the data code stream to the service server. The service server may decode the data code stream to obtain media data with a YUV format. The media data may be referred to as the to-be-coded media data.

It can be understood that when the terminal device transmits the data code stream to the service server, the terminal device may also transmit a service scenario type to which the media data belongs. The service scenario type to which the media data belongs is also a service scenario type to which the to-be-coded media data belongs. The service scenario type to which the to-be-coded media data belongs may be referred to as a first service scenario type. It can be understood that the service scenario type to which the to-be-coded media data belongs may be determined on the basis of an application type of a target application. For example, if a target application installed in the terminal device is an offline short video application, and the terminal device obtains video data through the camera during running the offline short video application, a service scenario type to which the video data belongs may be an offline short video type, so that the first service scenario type to which the corresponding to-be-coded media data belongs is the offline short video type. For example, if a target application installed in the terminal device is a live streaming application, and the terminal device obtains live video data through the camera (the terminal device obtains the live video data under a permission of a user corresponding to the terminal device) during running the live streaming application, a service scenario type to which the live video data belongs may be a live streaming type, so that the first service scenario type to which the corresponding to-be-coded media data belongs is the live streaming type. That is, if the to-be-coded media data is obtained through the target application, the first service scenario type to which the to-be-coded media data belongs may be an application type of the target application.

The target application here may include a social application, a multimedia application (for example, an offline short video application, a live streaming application, and an audio and video application), an entertainment application (for example, a game application), an educational application, and other applications with a media data coding function. Of course, the target application may also be other applications with data information display and video coding functions, which will not be illustrated one by one.

In some embodiments, a machine learning (ML) technology of artificial intelligence may be applied. The ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations. The following embodiments are used for specific explanation. When determining the first service scenario type to which the to-be-coded media data belongs, the service server may generate scenario features corresponding to the to-be-coded media data on the basis of a scenario prediction model, and then output a predicted scenario type corresponding to the scenario features in the scenario prediction model. The predicted scenario type may be used as the first service scenario type corresponding to the to-be-coded media data. The scenario prediction model may be a machine learning model trained according to historical media data with real scenario labels, which can be used to infer a predicted scenario type to which a certain piece of media data belongs.

Step S102: Obtain, according to mapping relationships between at least two coding configuration templates in a configuration template set and at least two service scenario types, a first coding configuration template corresponding to the first service scenario type. A mapping relationship exists between one coding configuration template and one service scenario type. The at least two coding configuration templates include the first coding configuration template.

In the present disclosure, different coding configuration templates may be configured in advance for different service scenario types, and one mapping relationship may be created for each service scenario type and its corresponding coding configuration template, thereby obtaining a configuration template set containing a plurality of mapping relationships. Thus, after the first service scenario type to which the to-be-coded media data is determined, the first coding configuration template corresponding to the first service scenario type may be determined according to the mapping relationships between the at least two coding configuration templates in the configuration template set and the at least two service scenario types.

Figure 4:
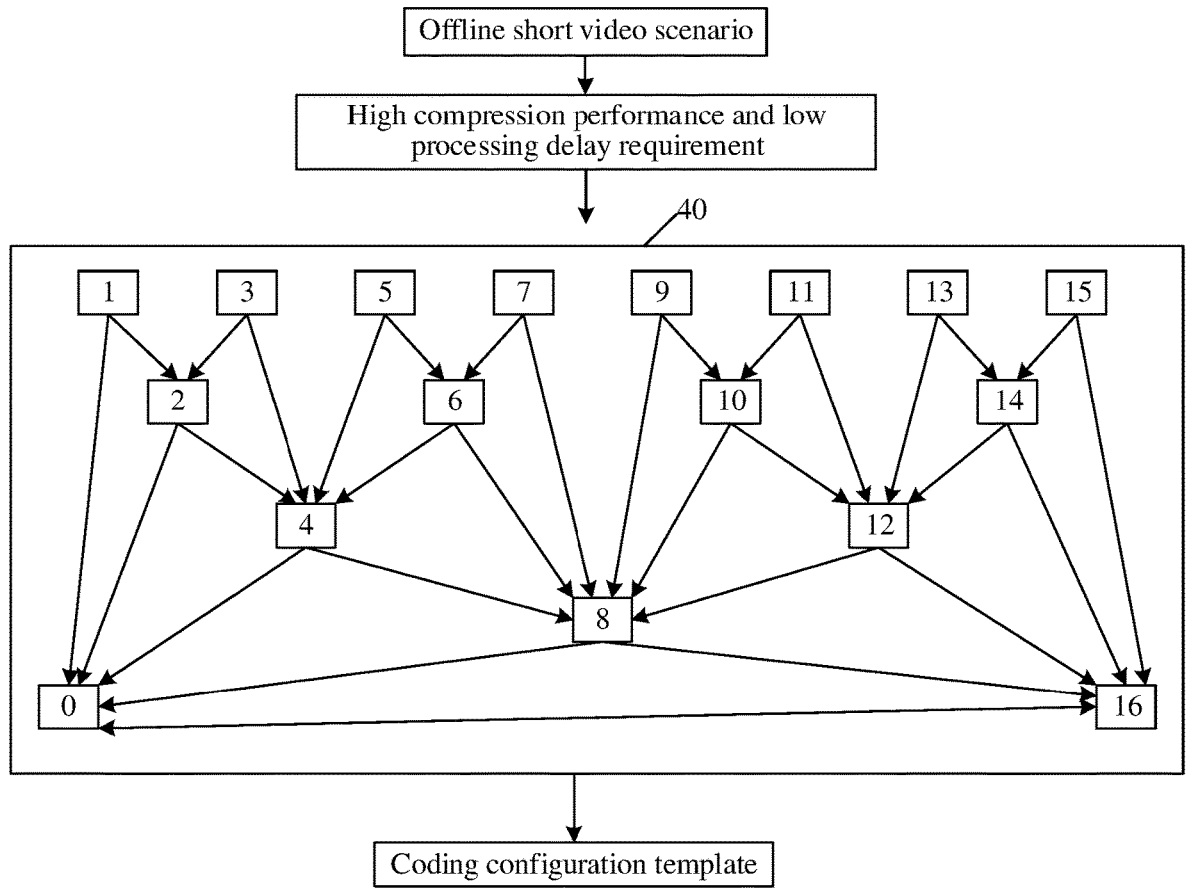
FIG. 4 is a schematic diagram of a scenario of matching a service scenario type with a coding configuration template according to an embodiment of the present disclosure.

For ease of understanding, referring to FIG. 4, FIG. 4 is a schematic diagram of a scenario of matching a service scenario type with a coding configuration template according to an embodiment of the present disclosure. A service scenario type as shown in FIG. 4 is described by taking an offline short video scenario as an example. First, coding requirements of the offline short video scenario may be obtained. A main goal of an offline short video is compression performance, but its requirement for a processing delay is not high, so the coding requirements of the offline short video scenario are as follows: high compression performance and low processing delay requirement. A coding configuration template of the offline short video may be configured according to the coding requirements of the scenario. Template configuration performed on the offline short video scenario may be understood as: configuring a frame type, a frame coding structure, and a frame coding quality parameter for video frames of the offline short video scenario.

Video frames can be configured on a frame group basis (one frame group may be referred to as a unit video frame group). The frame group may be a group of pictures (Group of Pictures (GOP)) in the video data, and one frame group may include a plurality of video frames. It is understood that a frame type of one frame of image may be determined according to a coding parameter setting and a code rate control policy. The frame type here may include a first type, a second type, and a third type. In this embodiment of the present disclosure, a frame type such as an intra frame (I frame) may be referred to as the first type; a frame type such as a bi-directional interpolated prediction frame (B frame, which is a bi-directional difference frame, recording differences between a current frame and previous and later frames; the B frame may be used as a reference frame for other B frames or not) is referred to as the second type; and a frame type such as a predictive-frame (P frame, which represents a difference between this frame and a previous key frame (or P frame); during decoding, a final picture is generated by overlaying a previously cached picture with a difference defined by this frame) is referred to as the third type. One GOP may be understood as an interval between two I frames. For example, a video frame includes 20 frames, where frame 1 is I frame; frames 2 to 8 are B frame; frame 9 is P frame; frame 10 is I frame; frames 11 to 19 are B frames; and frame 20 is P frame. Frame 1 is a start frame, and frame 9 is an end frame, to form one GOP (unit video frame group). Frame 10 can also be used as a start frame, and frame 20 can also be used as an end frame, to form one GOP (unit video frame group).

When a GOP and a frame sequence in the GOP are fixed, the frame sequence of each GOP is fixed. For example, if a GOP is fixed to include 120 frames, one I frame may be generated every 120 frames. The frame sequence of the GOP is fixed as follows: I B B P B B P . . . B B I. When a size of a GOP is fixed, but a frame sequence is not fixed, the frame sequence of each GOP is not fixed. For example, if a GOP is fixed to 120 frames, one I frame is generated every 120 frames. The frame sequence of the GOP may determine, according to a picture complexity and relevant P and B frames generation weights, whether a frame is P frame or B frame. When the size and frame sequence of a GOP are not fixed, automatic generation may be achieved according to picture textures, a motion complexity, I, P, and B frames generation policies, and weight configurations. For the above process of dividing a GOP (for example, one GOP is formed by taking frame 1 as a start frame and taking frame 9 as an end frame), it is only an example of how to divide a GOP, but does not have practical reference significance.

It can be understood that in this embodiment of the present disclosure, various video frames included in one GOP may be configured at a granularity of GOP, for example, reconfiguring a frame type distribution, a frame coding structure, and frame coding quality parameters (such as a quantization parameter and a code rate) of various frames. For example, for the offline short video scenario, a GOP with a size of 16 is taken as an example. I, B, P frame distributions and a frame coding structure (a layered coding structure 40 as shown in FIG. 4) may be reconfigured for video frames in one GOP. After the layered coding structure 40 is determined, a quantization parameter (QP) and a code rate control parameter (also referred to as a code control algorithm) may be configured for each layer in the layered coding structure 40. The above I, B, P frame type distributions, frame coding structure, and quantization parameters and rate code control parameter of each layer may be referred to as coding configuration templates corresponding to the offline short video scenario. Specifically, configuration parameters included in the coding configuration template, of course, are not limited to the frame type distribution, frame coding structure, and quantization parameter and rate control parameter of each layer described above (the quantization parameter and rate control parameter of each layer may be referred to as the frame coding quality parameter). For example, a reference group (MinGOP, which is a group formed within a GOP, and each frame within this group is only referenced in groups, in frames, and between frames) in the GOP may also be configured. The MinGOP may be controlled within a maximum of 16, with different resolutions having different maximum values. The specific values can be based on a standard RFC document, for example, the level 4.1 specification. Maximum values for 720P and 1080P videos are within 9 and 4, for more accurate and reasonable code control and QP adjustment.

Figure 6:
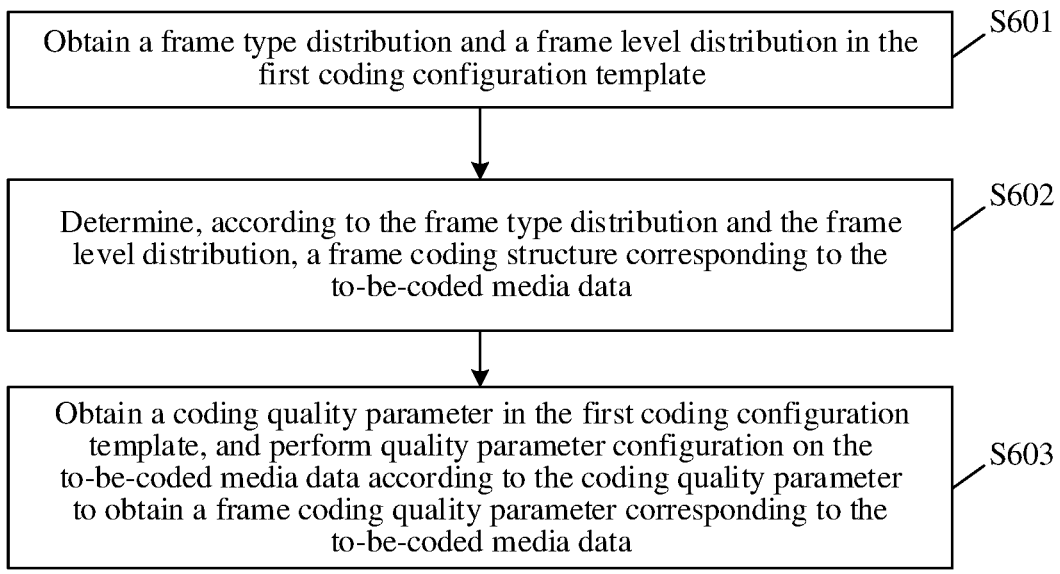
FIG. 6 is a flowchart of determining a frame coding parameter according to a first coding configuration template according to an embodiment of the present disclosure.

It can be understood that the use of layered coding can maintain a logic of dependency relationships between a group of frames, so the video frames that satisfy the dependency relationships may be coded simultaneously, which enables parallel coding and greatly improves the coding performance. For ease of understanding, the layered coding structure shown in FIG. 4 is taken as an example. This layered coding structure may be divided into five layers. Frame 0 is I frame, frame 16 is P frame, and the remaining frames are B frame. As shown in FIG. 6, data frame 8 (that is, to-be-coded data frame, for example, a video frame) needs to refer to data frame 0 and data frame 16 during the coding. Therefore, when the coding of data frame 16 is completed, the service server may code data frame 8. A frame type of data frame 8 may be referred to as B frame.

Data frame 4 needs to refer to data frame 0 and data frame 8 during the coding, and data frame 12 needs to refer to data frame 8 and data frame 16 during the coding. Therefore, when the coding of data frame 8 is completed, the service server may separately code data frame 4 and data frame 12. Frame types of data frame 4 and data frame 12 may be referred to as B frame.

Data frame 2 needs to refer to data frame 0 and data frame 4 during the coding, and data frame 6 needs to refer to data frame 4 and data frame 8 during the coding. Therefore, when the coding of data frame 4 is completed, the service server may separately code data frame 2 and data frame 6. Data frame 10 needs to refer to data frame 8 and data frame 12 during the coding, and data frame 14 needs to refer to data frame 12 and data frame 16 during the coding. Therefore, when the coding of data frame 12 is completed, the service server may code data frame 10 and data frame 14. Frame types of data frame 2, data frame 6, data frame 10, and data frame 14 may all be referred to as B frame.

Data frame 1 needs to refer to data frame 0 and data frame 2 during the coding, and data frame 3 needs to refer to data frame 2 and data frame 4 during the coding. Therefore, when the coding of data frame 2 is completed, the service server may separately code data frame 1 and data frame 3. Data frame 5 needs to refer to data frame 4 and data frame 6 during the coding, and data frame 7 needs to refer to data frame 6 and data frame 8 during the coding. Therefore, when the coding of data frame 6 is completed, the computer device may separately code data frame 5 and data frame 7. Data frame 9 needs to refer to data frame 8 and data frame during the coding, and data frame 11 needs to refer to data frame 10 and data frame 12 during the coding. Therefore, when the coding of data frame 10 is completed, the service server may separately code data frame 9 and data frame 11. Data frame 13 needs to refer to data frame 12 and data frame 14 during the coding, and data frame 15 needs to refer to data frame 14 and data frame 16 during the coding. Therefore, when the coding of data frame 14 is completed, the service server may separately code data frame 13 and data frame 15. Data frame 1, data frame 3, data frame 5, data frame 7, data frame 9, data frame 11, data frame 13, and data frame 15 are not referred to, and frame types of these eight reference frames may all be referred to as B frame.

In summary, the present disclosure can configure different coding configuration templates for different service scenario types (for example, configuring the frame type distribution, the layered coding structure, the quantization parameter and rate control parameter of each layer at the granularity of one GOP). After the templates are configured for the various service scenario types, a mapping relationship may be established between each service scenario type and its corresponding coding configuration template. From this, the configuration template set containing the plurality of mapping relationships may be obtained. After the to-be-coded media data and the first service scenario type to which the to-be-coded media data belongs, the first coding configuration template corresponding to the first service scenario type can be determined according to the configuration template set.

A specific implementation of obtaining, according to mapping relationships between at least two coding configuration templates in a configuration template set and at least two service scenario types, a first coding configuration template corresponding to the first service scenario type may be: traversing the at least two service scenario types in the configuration template set; determining, from the at least two coding configuration templates in response to that the at least two service scenario types include a target service scenario type identical with the first service scenario type, that a coding configuration template having a mapping relationship with the first service scenario type is the first coding configuration template corresponding to the first service scenario type; and determining, in response to that the at least two service scenario types do not include a service scenario type identical with the first service scenario type, scenario similarities between the at least two service scenario types and the first service scenario type, and determining the first coding configuration template corresponding to the first service scenario type according to the at least two scenario similarities.

A specific implementation of determining the first coding configuration template corresponding to the first service scenario type according to the at least two scenario similarities may be: obtaining a maximum scenario similarity from the at least two scenario similarities, and comparing the maximum scenario similarity with a scenario similarity threshold; and determining, from the at least two service scenario types in response to that the maximum scenario similarity is greater than the scenario similarity threshold, a service scenario type corresponding to the maximum scenario similarity as a matching service scenario type, and determining, from the at least two coding configuration templates, a coding configuration template having a mapping relationship with the matching service scenario type as the first coding configuration template corresponding to the first service scenario type.

It is understood that after the first service scenario type to which the to-be-coded media data belongs, the configuration template set can be traversed. If there is a service scenario type in the configuration template set that is identical with the first service scenario type (namely, a template has been configured for the first service scenario type), the coding configuration template corresponding to the service scenario type can be directly determined as the first coding configuration template. If there is no service scenario type in the configuration template set that is identical with the first service scenario type (namely, no template has been configured for the first service scenario type), a service scenario type in the configuration template set that is most similar to the first service scenario type (namely, the matching service scenario type) can be determined. If the scenario similarity between the two types is greater than or equal to the scenario similarity threshold, a coding configuration template corresponding to the most similar service scenario type can be taken as the first coding configuration template. In some embodiments, if the configuration template set does not include the first service scenario type, and the scenario similarity between the most similar service scenario type and the first service scenario type is also less than the scenario similarity threshold, template configuration can be performed in real time according to a scenario coding requirement of the first service scenario type, and a mapping relationship between the configured template and the first service scenario type can be constructed and can be stored in the configuration template set for future use.

Step S103: Determine a frame coding parameter of the to-be-coded media data according to the first coding configuration template.

Step S104: Code the to-be-coded media data according to the determined frame coding parameter to obtain first media data. The first media data has first media quality. The first media quality corresponds to the first service scenario type.

In the present disclosure, after the first coding configuration template corresponding to the first service scenario type is determined, the frame coding parameter of the to-be-coded media data can be determined according to the first coding configuration template. The frame coding parameter may include the frame coding structure and the frame coding quality parameter. The frame coding structure may refer to a coding structure of a to-be-coded data frame (for example, when the to-be-coded media data is video data, the to-be-coded data frame can refer to a to-be-coded video frame), and the frame coding quality parameter may include the quantization parameter QP, the code rate control parameter, a resolution, and the like. It is understood that the present disclosure can configure the frame coding structure and frame coding quality parameter for the to-be-coded data frame in each GOP by taking GOP as a unit. For a specific implementation of determining the frame coding parameter of the to-be-coded media data, please refer to the subsequent description in the corresponding embodiment of FIG. 6.

Further, after the frame coding parameter of the to-be-coded media data is determined (namely, the frame coding structure and frame coding quality parameter of the to-be-coded data frame are determined), the to-be-coded media data can be coded according to the frame coding parameter, that is, the to-be-coded data frame can be coded according to the frame coding structure and the frame coding quality parameter, thereby obtaining the first media data with the first media quality (that is, having a certain resolution, code rate, and compression performance.

Figure 5:
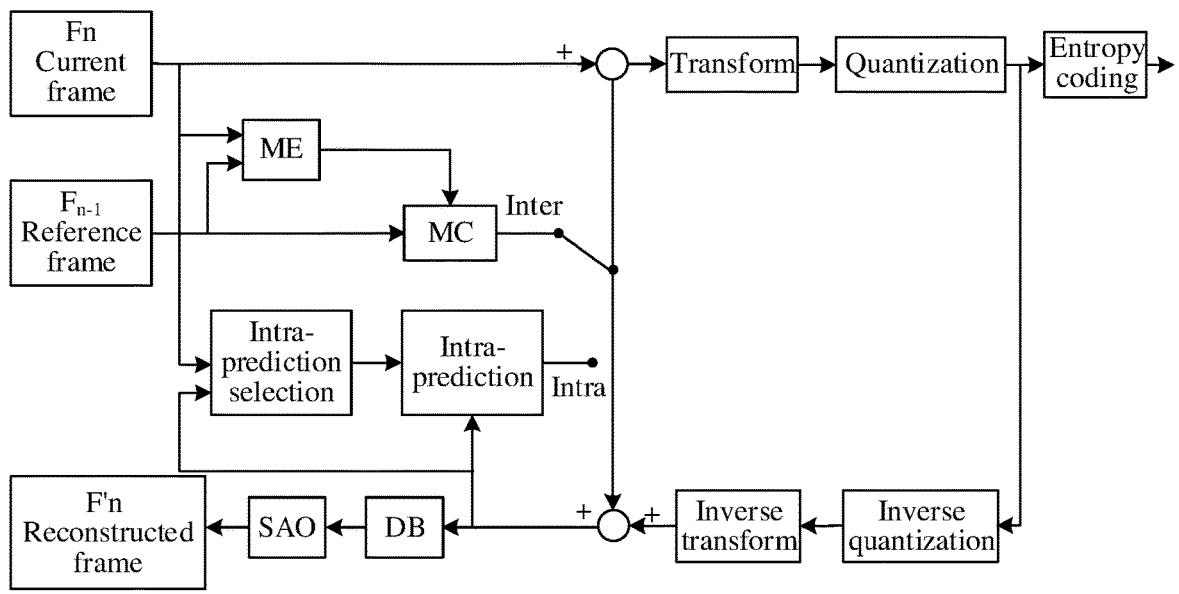
FIG. 5 is a schematic diagram of a coding processing process according to an embodiment of the present disclosure.

For ease of understanding the process of coding the to-be-coded data frame, please refer to FIG. 5. FIG. 5 is a schematic diagram of a coding processing process according to an embodiment of the present disclosure.

As shown in FIG. 5, a frame of image (a current frame Fn as shown in FIG. 5) is transmitted to a video encoder. The image can be first divided into a plurality of coding tree units (CTUs) according to a size of 64×64 blocks. After deep division, coding units (CUs) can be obtained, where each CU may contain a predict unit (PU) and a transform unit (TU). It can be understood that the video encoder can obtain a coding unit (namely, a CU) from the current frame Fn, and then predict the CU to obtain the predict unit. At this time, a degree of content variation between the predict unit and the CU can be determined, so that a residual between the predict unit and the CU can be determined on the basis of the degree of content variation (for example, intra-prediction and inter-prediction can be performed on the basis of the current frame Fn and a reference frame F'n−1 shown in FIG. 5, and motion estimation (ME) and motion compensation (MC) are performed in the figure). Then, the service server can perform transform processing (for example, Discrete Cosine Transform (DCT)) and quantization processing on the residual to obtain the quantization parameter (also referred to as a residual parameter), and then perform entropy coding on the quantization parameter to obtain a compressed code stream corresponding to the CU (namely, an arrow output shown in FIG. 5). Prediction manners for predicting the CU may include an intra-prediction manner and an inter-prediction manner.

At the same time, the service server may perform inverse quantization (as shown in FIG. 5) and inverse transform (as shown in FIG. 5) on the quantization parameter to obtain a residual value corresponding to a reconstructed image. The reconstructed image (which can correspond to a reconstructed frame F'n shown in the figure) can be obtained on the basis of the residual value and the CU. For example, the residual value can be added to a predicted value, and the reconstructed image is obtained on the basis of DeBlock Filter (DB) and Sample Adaptive Offset (SAO). Further, the service server may perform filtering processing on the reconstructed image (such as intra loop filtering) to obtain a filtered image. After the coding of the current frame Fn is completed, a reconstructed frame corresponding to the current frame Fn may be obtained on the basis of the filtered image, and the reconstructed frame may be added to a reference frame queue as a reference frame for a next frame, thereby performing coding subsequently.

Prediction may start from the largest code unit (LCU), and each layer is divided downward according to a quadtree, to perform recursive calculation.

Firstly, each layer can be divided from top to bottom. According to a depth=0, a block with a size of 64×64 is first divided into four sub-CUs with a size of 32×32. A sub-CU with the size of 32×32 is further divided into four sub-CUs with a size of 16×16, and so on, until a depth is equal to 3 and a size of a CU is 8×8.

Then, each layer can be trimmed from bottom to top. A Rate Distortion Optimization cost (RDcost) of four CUs with the size of 8×8 is summed (denoted as cost1), and is compared with the RDcost (denoted as cost2) of the corresponding CUs with the size of 16×16 of the previous level. If cost1 is less than cost2, the division of the CUs with the size of 8×8 can be retained, otherwise trimming is performed upwards, and comparison is performed layer by layer. Finally, an optimal CU depth partitioning situation can be found out.

It can be understood that prediction of a PU may include intra-prediction and inter-prediction. Different PUs can be compared within the same prediction type to find out an optimal division mode, and intra and inter modes are compared to find an optimal prediction mode in a current CU. At the same time, Residual Quad-tree Transform (RQT) can be performed on the CU to find out an optimal TU mode. Finally, a frame of image can be divided into individual CUs, as well as PUs and TUs in the corresponding CUs.

It can be understood that before the coding, a series of coding parameters (for example, the frame coding structure and the code rate control parameter) corresponding to the to-be-coded media data can be quickly determined according to the template configured for the scenario, so that the coded media data can satisfy a required code rate limit and minimize coding distortion. Code rate control belongs to the rate distortion optimization, which is mainly to determine a quantization parameter that matches a code rate. This requires a large amount of computation. However, by configuring the quantization parameter in advance, the present disclosure can effectively reduce the amount of computation during the coding and improve the coding efficiency.

In some embodiments, when acquiring media data (for example, video data), the terminal device needs to code the media data. The acquired media data may also be referred to as the to-be-coded media data. The terminal device may also obtain a first coding configuration template from a configuration template set according to a first service scenario type, determine a frame coding parameter corresponding to the to-be-coded media data according to the first coding configuration template, and code the media data according to the frame coding parameter. The specific process will not be repeatedly described here.

In this embodiment of the present disclosure, different coding configuration templates can be configured for different service scenario types to generate a configuration template set. The configuration template set may include each service scenario type and its corresponding coding configuration template (with a mapping relationship). When the to-be-coded media data is obtained, the first coding configuration template corresponding to the first service scenario type can be quickly obtained from the configuration template set according to the first service scenario type to which the to-be-coded media data belongs. Then, the frame coding parameter of the to-be-coded media data can be determined according to the first coding configuration template, and the to-be-coded media data can be coded according to the frame coding parameter to obtain target media data with target media quality matching the first service scenario type. That is, by configuring different coding configuration templates for different service scenario types in advance, the first coding configuration template corresponding to the first service scenario type can be found through querying during the coding, and the frame coding parameter of the to-be-coded media data can be quickly determined through the first coding configuration template, which can effectively reduce the amount of computation and coding time in the coding process, and improve the coding efficiency of a computer device for the to-be-coded media data. At the same time, according to the manner of adaptively selecting a coding configuration template according to a service scenario type, the selected first coding configuration template will match the first service scenario type, and the first media quality of the coded first media data matches the first service scenario type, that is, the frame coding parameter determined on the basis of the first coding configuration template meets the coding requirements of the first service scenario type and has scenario adaptability. The compression performance of the first media data obtained by using the frame coding parameter is also high. In conclusion, the present disclosure can improve the coding efficiency and the code compression performance.

Further, referring to FIG. 6, FIG. 6 is a flowchart of determining a frame coding parameter according to a first coding configuration template according to an embodiment of the present disclosure. This flow can correspond to the corresponding embodiment in FIG. 3 above. For the flow of determining the frame coding parameter of the to-be-coded media data according to the first coding configuration template, the frame coding parameter in this process may include the frame coding structure and the frame coding quality parameter. As shown in FIG. 6, the flow may at least include step S601 to step S603 below:

Step S601: Obtain a frame type distribution and a frame level distribution in the first coding configuration template.

Specifically, the frame type here may include a first type, a second type, and a third type. In this embodiment of the present disclosure, a frame type such as an intra picture (I frame) may be referred to as the first type; a frame type such as a bi-directional interpolated prediction frame (B frame) is referred to as the second type; and a frame type such as a predictive-frame (P frame) is referred to as the third type. The frame level distribution may refer to a layered coding structure (a total quantity of layers, a quantity of frames in each layer, and the like). For example, the layered coding structure 40 in the corresponding embodiment of FIG. 4 can be the frame level distribution. The total quantity of layers in the layered coding structure is the quantity of frames in layer 1 is 2 (including frames 1 and 16: frame 1 is I frame, and frame 16 is P frame); the quantity of frames in layer 2 is 1 (including frame 8, which is B frame); and the quantity of frames in layer 3 is 2 (including frames 4 and 12, both frames 4 and 12 are B frames). This layered coding structure also includes layer 4 and layer 5. The layered coding structure 40 will not be explained here.

Step S602: Determine, according to the frame type distribution and the frame level distribution, a frame coding structure corresponding to the to-be-coded media data.

Specifically, the present disclosure can configure frame types and layered coding structures at a granularity of GOP. Therefore, the present disclosure can determine a frame coding structure corresponding to each GOP (referred to as a unit data frame group) according to the first coding configuration template at the granularity of GOP. A specific method may be as follows: A unit data frame group corresponding to the to-be-coded media data may be obtained, the unit data frame group being composed of N continuous to-be-coded data frames, the to-be-coded media data including the to-be-coded data frames, and N being a positive integer. Next, a frame group frame type distribution (namely, a frame type distribution configured for the frames in each GOP) corresponding to the unit data frame group in the frame type distribution may be obtained, and type division may be performed on the to-be-coded data frames in the unit data frame group according to the frame group frame type distribution to obtain data frames after type division. In other words, the data frames may be classified into different types of data frames according to the frame group frame type distribution. Subsequently, a frame group frame level distribution in frame level distribution corresponding to the unit corresponding to the unit data frame group may be obtained, and level division may be performed on the data frames after type division according to the frame level distribution to obtain a layered coding structure corresponding to the unit data frame group. In other words, levels of the data frames may be determined based on the classified types of the data frames and the frame level distribution. The layered coding structure is determined as the frame coding structure corresponding to the to-be-coded media data.

In one embodiment, step S602 may include: obtaining each unit data frame group in the to-be-coded media data, each unit data frame group being composed of N continuous to-be-coded data frames, and N being a positive integer; performing type division on the to-be-coded data frames in each unit data frame group according to the frame type distribution to obtain data frames after type division; performing level division on the data frames after type division according to the frame level distribution to obtain a layered coding structure corresponding to each unit data frame group; and determining, according to the layered coding structure corresponding to each unit data frame group, the frame coding structure corresponding to the to-be-coded media data.

For example, an example in which the frame level distribution corresponding to the GOP is the layered coding structure 40 is taken. After the type division is performed on the frames in a GOP to obtain I, B, P distributions, these frames can fill the layered coding structure 40. For example, if frame 1 is I frame, frame 1 fills the position for frame 1 in layer 1 of the layered coding structure 40. After the frame types of the various frames and the levels at which the frames are located are determined, the layered coding structure including the various frames can be determined as the frame coding structure corresponding to the GOP.

Step S603: Obtain a coding quality parameter in the first coding configuration template, and perform quality parameter configuration on the to-be-coded media data according to the coding quality parameter to obtain a frame coding quality parameter corresponding to the to-be-coded media data.

Specifically, it can be known from the above that the frame coding structure is a layered coding structure. The layered coding structure including a first level and a second level can be taken as an example, and the second level is higher than the first level. The present disclosure can also configure the frame coding quality parameter (for example, the quantization parameter (QP) and the code rate control parameter) for each level. The coding quality parameter including a first coding quality parameter corresponding to the first level and a second coding quality parameter corresponding to the second level is taken as an example. A specific method of performing quality parameter configuration on the to-be-coded media data according to the coding quality parameter to obtain a frame coding quality parameter corresponding to the to-be-coded media data may be as follows: A first to-be-coded data frame at the first level in the layered coding structure and a second to-be-coded data frame at the second level in the layered coding structure may be obtained from the to-be-coded media data. The present disclosure can directly use the first coding quality parameter as the frame coding quality parameter corresponding to the first to-be-coded data frame and use the second coding quality parameter as the frame coding quality parameter corresponding to the second to-be-coded data frame.

In some embodiments, it can be understood that the present disclosure can also adjust the templates configured according to the scenarios according to device information of a decoding end (for example, a terminal device waiting to play the media data). For example, the device information may include network state information, terminal decoding ability, and the like. Therefore, the present disclosure can adjust the templates according to the network state information, the terminal decoding ability, and the like of the terminal device (for example, adjusting the coding quality parameter, the quantity of layers in the layered coding structure, and the like).

Adjusting the coding quality parameter is taken as an example. A specific method for performing quality parameter configuration on the to-be-coded media data according to the coding quality parameter to obtain a frame coding quality parameter corresponding to the to-be-coded media data may be as follows: A first to-be-coded data frame at the first level in the layered coding structure and a second to-be-coded data frame at the second level in the layered coding structure may be obtained from the to-be-coded media data. Device index information of a first terminal may be obtained, the first terminal referring to a terminal waiting to play the to-be-coded media data. In response to that the device index information satisfies a parameter adjustment condition, a frame coding quality parameter corresponding to the first to-be-coded data frame may be determined according to the device index information and the first coding quality parameter, a frame coding quality parameter corresponding to the second to-be-coded data frame may be determined according to the device index information and the second coding quality parameter.

The device index information including a network quality parameter and decoding computing power information is taken as an example. A specific method for determining whether the device index information satisfies the parameter adjustment condition may be as follows: The network quality parameter may be matched with a network parameter threshold, and the decoding computing power information may be matched with a computing power threshold. If the network quality parameter is greater than (or equal to) the network parameter threshold, and the decoding computing power information is greater than (or equal to) the computing power threshold, it can be determined that the device index information does not satisfy the parameter adjustment condition. If the network quality parameter is less than the network parameter threshold, or the decoding computing power information is less than the computing power threshold, it can be determined that the device index information satisfies the parameter adjustment condition.

In some embodiments, it can be understood that if the device index information does not satisfy the parameter adjustment condition, the first coding quality parameter can be directly determined as the frame coding quality parameter corresponding to the first to-be-coded data frame, and the second coding quality parameter can be determined as the frame coding quality parameter corresponding to the second to-be-coded data frame.

When the device index information satisfies the parameter adjustment condition, a specific implementation process for determining a frame coding quality parameter corresponding to the first to-be-coded data frame according to the device index information and the first coding quality parameter may be as follows: A parameter mapping table may be obtained. The parameter mapping table contains a mapping relationship between a network quality interval set and an adaptation code rate control parameter set, and there is a mapping relationship between one network quality interval and one adaptation code rate control parameter. Subsequently, the network quality parameter corresponding to the first terminal may be obtained. A first network quality interval to which the network quality parameter belongs may be obtained from the network quality interval set. A network adaptation code rate control parameter having a mapping relationship with the first network quality interval may be obtained. The frame coding quality parameter corresponding to the first to-be-coded data frame may be determined according to the scenario code rate control parameter and the network adaptation code rate control parameter.

In a feasible embodiment, a specific implementation process for determining the frame coding quality parameter corresponding to the first to-be-coded data frame according to the scenario code rate control parameter and the network adaptation code rate control parameter may be as follows: A first operational coefficient corresponding to the first service scenario type and a second operational coefficient corresponding to the network quality parameter may be obtained. Subsequently, operational processing (i.e., calculation) is performed on the first operational coefficient and the scenario code rate control parameter to obtain a first operation code rate control parameter. Operational processing is performed on the second operational coefficient and the network adaptation code rate control parameter to obtain a second operation code rate control parameter. A mean value of the first operation code rate control parameter and the second operation code rate control parameter may be determined, and the mean value may be determined as the frame coding quality parameter corresponding to the first to-be-coded data frame.

It can be understood that when the device index information satisfies the parameter adjustment condition, that is, when a network state of the terminal device is relatively poor or the terminal decoding ability is low, the frame coding quality parameter can be appropriately reduced (for example, the code rate is reduced) to match the network state or decoding ability of the terminal device. Different code rate control parameters (referred to as network adaptation code rate control parameter) can be configured in advance for different network states (for example, network quality intervals) or decoding abilities. When it is determined that the device index information satisfies the parameter adjustment condition, the network state (or decoding ability) at the terminal device can be obtained, and its corresponding network adaptation code rate control parameter can be obtained according to the network state of the terminal device. Subsequently, the mean value between the scenario code rate control parameter (namely, the code rate control parameters configured for different service scenario types) and the network adaptation code rate control parameter can be determined. This mean value can be determined as the frame coding quality parameter of the to-be-coded data frame.

In a feasible embodiment, operational coefficients (which can be understood as weights) can also be configured for the scenario and the network state (or decoding ability) of the terminal device. After the scenario code rate control parameter and the network adaptation code rate control parameter are determined, during operation, the scenario code rate control parameter and its corresponding first operational coefficient can be first operated (for example, multiplied), to obtain a first operation code rate control parameter (a product result). At the same time, the network adaptation code rate control parameter and the second operational coefficient are then operated (for example, multiplied) to obtain a second operation code rate control parameter. Then, a mean value between the first operation code rate control parameter and the second operation code rate control parameter is determined as the frame coding quality parameter of the to-be-coded data frame.

In one embodiment, a specific implementation for determining the frame coding quality parameter corresponding to the first to-be-coded data frame according to the scenario code rate control parameter and the network adaptation code rate control parameter may be as follows: The scenario code rate control parameter and the network adaptation code rate control parameter may be compared to determine a minimum code rate control parameter from the scenario code rate control parameter and the network adaptation code rate control parameter. The minimum code rate control parameter may be determined as the frame coding quality parameter corresponding to the first to-be-coded data frame.

It is understood that when the network state or the decoding ability of the terminal device is poor, the minimum rate control parameter from the scenario code rate control parameter and the network adaptation code rate control parameter can be taken as the frame coding quality parameter of the to-be-coded data frame. This can ensure that the terminal device can perform decoding successfully.

In one embodiment, a specific implementation for determining the frame coding quality parameter corresponding to the first to-be-coded data frame according to the scenario code rate control parameter and the network adaptation code rate control parameter may be as follows: After the network adaptation code rate control parameter is obtained, the network adaptation code rate control parameter can be directly determined as the frame coding quality parameter of the to-be-coded data frame (namely, the scenario code rate control parameter is replaced with the network adaptation code rate control parameter).

The computing power information in the present disclosure can refer to hardware or network resources occupied by a computer device (for example, a service server and a terminal device) during performing computing tasks, and usually can include computing power information of a central processing unit (CPU), a graphics processing unit (GPU), internal memory resources, network bandwidth resources, disk resources, and the like.

In some embodiments, it can be understood that the present disclosure can also configure different templates for the same service scenario type according to different network states in advance. For example, for the same service scenario type, three configuration network scenarios can be subdivided. For a configuration network scenario with a good network state (for example, the network quality parameter is greater than a certain first threshold), the frame coding quality parameter (for example, the code rate) in the template can be set to be larger. For a configuration network scenario with a medium network state (for example, the network quality parameter is between a second threshold and the first threshold, and the second threshold is less than the first threshold), the frame coding quality parameter (for example, the code rate) in the template can be set to be smaller. For a configuration network scenario with a poor network state, the frame coding quality parameter in the template can be set to be the smallest. After the first service scenario type of the to-be-coded media data is determined, the network state of the terminal device can be obtained first, and the corresponding first coding configuration template can be determined jointly according to the first service scenario type and network state.

In this embodiment of the present disclosure, different coding configuration templates can be configured for different service scenario types to generate a configuration template set. The configuration template set may include each service scenario type and its corresponding coding configuration template (with a mapping relationship). When the to-be-coded media data is obtained, the first coding configuration template corresponding to the first service scenario type can be quickly obtained from the configuration template set according to the first service scenario type to which the to-be-coded media data belongs. Then, the first coding configuration template can be appropriately adjusted according to a real-time network state (or the terminal decoding ability), and the frame coding parameter of the to-be-coded media data is finally determined; and the to-be-coded media data is coded according to the frame coding parameter to obtain first media data with first media quality matching the first service scenario type. That is, by configuring different coding configuration templates for different service scenario types in advance, the first coding configuration template corresponding to the first service scenario type can be found through querying during the coding, and the frame coding parameter of the to-be-coded media data can be quickly determined through the first coding configuration template and the network state (or the terminal decoding ability), which can effectively reduce the amount of computation and coding time in the coding process, and improve the coding efficiency for the to-be-coded media data. At the same time, according to the manner of adaptively selecting and adjusting a coding configuration template according to a service scenario type and a network state (or terminal decoding ability), the determined first coding configuration template will match the first service scenario type and the network state, and the first media quality of the coded first media data matches the first service scenario type and the network state, that is, the frame coding parameter determined on the basis of the first coding configuration template meets the coding requirements of the first service scenario type, has scenario adaptability, and also meets a demand for a network state. The compression performance of the first media data obtained by using the frame coding parameter is also high. In conclusion, the present disclosure can improve the coding efficiency and the code compression performance.

Figure 7:
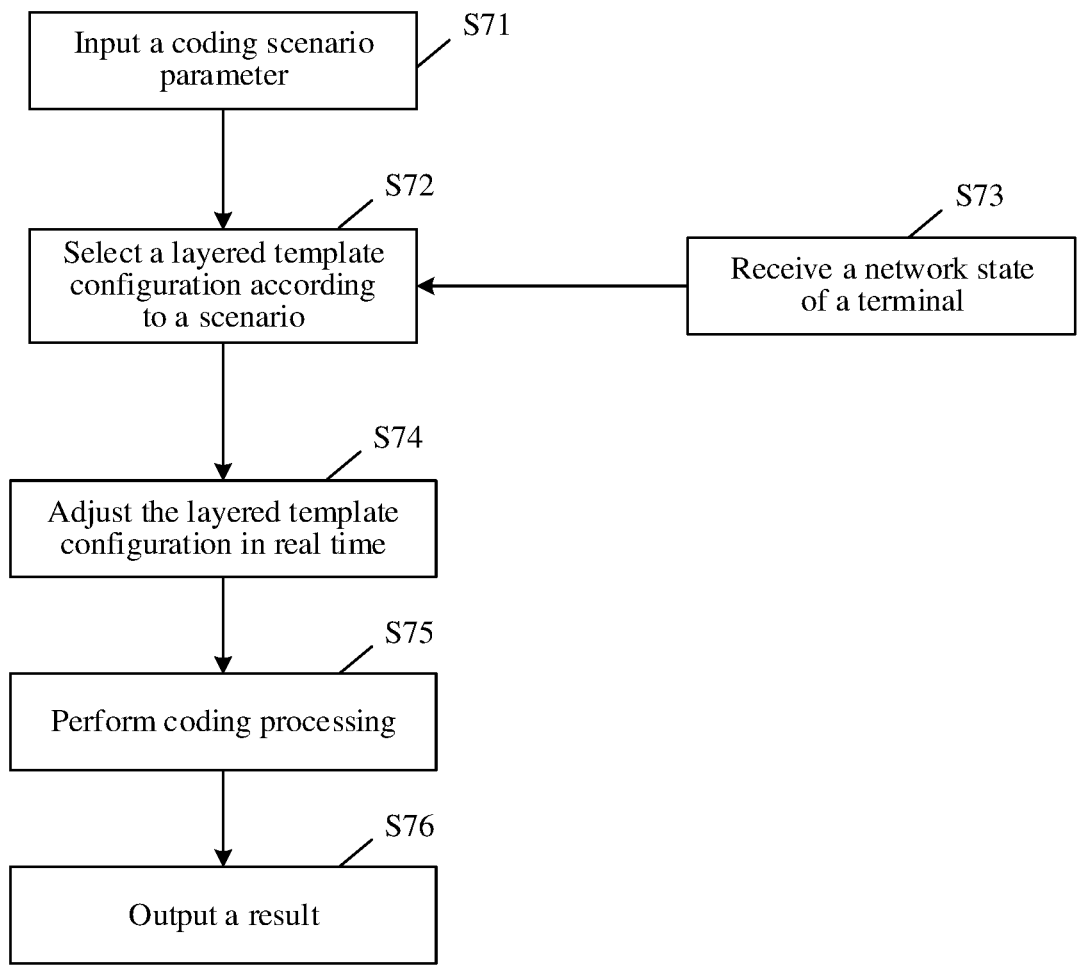
FIG. 7 is a flowchart of a system according to an embodiment of the present disclosure.

Further, referring to FIG. 7, FIG. 7 is a flowchart of a system according to an embodiment of the present disclosure. As shown in FIG. 7, the flow may at least include step S71 to S76 below:

Step S71: Input a coding scenario parameter.

Specifically, the coding scenario parameter here may be a parameter corresponding to a service scenario type to which to-be-coded media data belongs. After a media data encoder (for example, a video encoder) is initialized, the coding scenario parameter may be inputted.

Step S72: Select a layered template configuration according to a scenario.

Specifically, different coding configuration templates may be configured for different service scenario types. The coding configuration template here may be a layered coding configuration template. After the coding scenario parameter is inputted, a corresponding layered coding configuration template may be obtained according to the scenario parameter.

Step S73: Receive a network state of a terminal.

Step S74: Adjust the layered template configuration in real time.

Specifically, the selected layered template configuration may be adjusted in real time according to the network state of the terminal. For example, a quantity of layers of a layered coding structure in the template configuration, a quantity of frames in each layer, and a frame coding quality parameter (for example, a quantization parameter and a code rate control parameter) corresponding to each layer can be adjusted.

Step S75: Perform coding processing.

Specifically, a to-be-coded data frame of the to-be-coded media data may be coded according to the adjusted layered template configuration.

Step S76: Output a coding result.

For specific implementations of step S71 to step S76, refer to step S101 to step S103 in the corresponding embodiment in FIG. 3, and details are not described here again. Beneficial effects achieved are not described here again.

Figure 8:
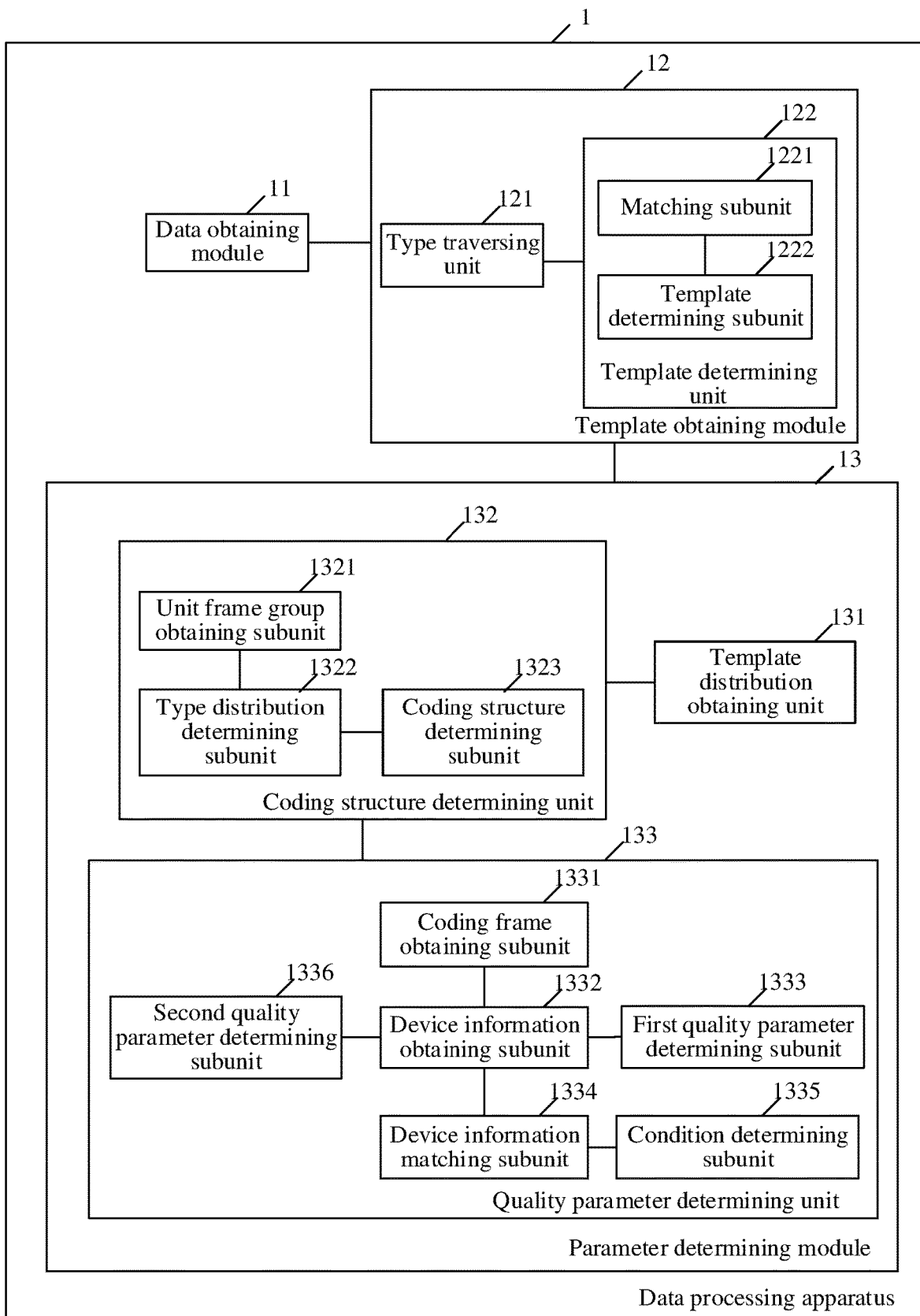
FIG. 8 is a schematic structural diagram of a data processing apparatus according to an embodiment of the present disclosure.

Further, referring to FIG. 8, FIG. 8 is a schematic structural diagram of a data processing apparatus according to an embodiment of the present disclosure. The data processing apparatus may be a computer program (including program codes) run in a computer device. For example, the data processing apparatus may be application software. The data processing apparatus may be configured to implement the method shown in FIG. 3. As shown in FIG. 8, the data processing apparatus 1 may include: a data obtaining module 11, a template obtaining module 12, a parameter determining module 13, and a data coding module 14.

The data obtaining module 11 is configured to obtain to-be-coded media data and a first service scenario type to which the to-be-coded media data belongs.

The template obtaining module 12 is configured to obtain, according to mapping relationships between at least two coding configuration templates in a configuration template set and at least two service scenario types, a first coding configuration template corresponding to the first service scenario type. A mapping relationship exists between one coding configuration template and one service scenario type. The at least two coding configuration templates include the first coding configuration template.

The parameter determining module 13 is configured to determine a frame coding parameter of the to-be-coded media data according to the first coding configuration template.

The data coding module 14 is configured to code the to-be-coded media data according to the determined frame coding parameter to obtain first media data. The first media quality matches/corresponds to the first service scenario type.

For specific implementations of the data obtaining module 11, the template obtaining module 12, the parameter determining module 13, and the data coding module 14, refer to the descriptions of step S101 to step S104 in the corresponding embodiment in FIG. 3 above, and details will not be repeated here.

In one embodiment, the template obtaining module 12 may include: a type traversing unit 121 and a template determining unit 122.

The type traversing unit 121 is configured to traverse the at least two service scenario types in the configuration template set.

The template determining unit 122 is configured to: determine, from the at least two coding configuration templates in response to that the at least two service scenario types include a service scenario type identical with the first service scenario type, that a coding configuration template having a mapping relationship with the first service scenario type is the first coding configuration template corresponding to the first service scenario type.

The template determining unit 122 is also configured to: determine, in response to that the at least two service scenario types do not include a service scenario type identical with the first service scenario type, scenario similarities between the at least two service scenario types and the first service scenario type.

The template determining unit 122 is also configured to: determine the first coding configuration template corresponding to the first service scenario type according to the at least two scenario similarities.

For specific implementations of the type traversing unit 121 and the template determining unit 122, refer to the description of step S102 in the corresponding embodiment in FIG. 3 above, and details will not be repeated here.

In an embodiment, the template determining unit 122 may include: a matching subunit 1221 and a template determining subunit 1222.

The matching subunit 1221 is configured to: obtain a maximum scenario similarity from the at least two scenario similarities, and compare the maximum scenario similarity with a scenario similarity threshold.

The template determining subunit 1222 is configured to: determine, from the at least two service scenario types in response to that the maximum scenario similarity is greater than the scenario similarity threshold, a service scenario type corresponding to the maximum scenario similarity as a matching service scenario type, and determine, from the at least two coding configuration templates, a coding configuration template having a mapping relationship with the matching service scenario type as the first coding configuration template corresponding to the first service scenario type.

For specific implementations of the matching subunit 1221 and the template determining subunit 1222, refer to the description of step S102 in the corresponding embodiment in FIG. 3 above, and details will not be repeated here.

In an embodiment, the frame coding parameter includes a frame coding structure and a frame coding quality parameter.

The parameter determining module 13 may include: a template distribution obtaining unit 131, a coding structure determining unit 132, and a quality parameter determining unit 133.

The template distribution obtaining unit 131 is configured to obtain a frame type distribution and a frame level distribution in the first coding configuration template.

The coding structure determining unit 132 is configured to determine, according to the frame type distribution and the frame level distribution, a frame coding structure corresponding to the to-be-coded media data.

The quality parameter determining unit 133 is configured to obtain a coding quality parameter in the first coding configuration template, and perform quality parameter configuration on the to-be-coded media data according to the coding quality parameter to obtain a frame coding quality parameter corresponding to the to-be-coded media data.

For specific implementations of the template distribution obtaining unit 131, the coding structure determining unit 132, and the quality parameter determining unit 133, refer to the descriptions of steps S103 and S104 in the corresponding embodiment in FIG. 3 above, and details will not be repeated here.

In an embodiment, the coding structure determining unit 132 may include: a unit frame group obtaining subunit 1321, a type distribution determining subunit 1322, and a coding structure determining subunit 1323.

The unit frame group obtaining subunit 1321 is configured to obtain each unit data frame group in the to-be-coded media data, each unit data frame group being composed of N continuous to-be-coded data frames, and N being a positive integer, the to-be-coded media data including the to-be-coded data frames, and N being a positive integer.

The type distribution determining subunit 1322 is configured to perform type division on the to-be-coded data frames in each unit data frame group according to the frame type distribution to obtain data frames after type division.

The coding structure determining subunit 1323 is configured to perform level division on the data frames after type division according to the frame level distribution to obtain a layered coding structure corresponding to each unit data frame group.

The coding structure determining subunit 1323 is also configured to determine, according to the layered coding structure corresponding to each unit data frame group, the frame coding structure corresponding to the to-be-coded media data.

For specific implementations of the unit frame group obtaining subunit 1321, the type distribution determining subunit 1322, and the coding structure determining subunit 1323, refer to the descriptions of steps S103 and S104 in the corresponding embodiment in FIG. 3 above, and details will not be repeated here.

In an embodiment, the frame coding structure is a layered coding structure. The layered coding structure includes a first level and a second level. The second level is higher than the first level. The coding quality parameter includes a first coding quality parameter corresponding to the first level, and a second coding quality parameter corresponding to the second level.

The quality parameter determining unit 133 may include: a coding frame obtaining subunit 1331, a device information obtaining subunit 1332, and a first quality parameter determining subunit 1333.

The coding frame obtaining subunit 1331 is configured to obtain, from the to-be-coded media data, a first to-be-coded data frame at the first level in the layered coding structure and a second to-be-coded data frame at the second level in the layered coding structure.

The device information obtaining subunit 1332 is configured to obtain device index information of a first terminal, the first terminal referring to a terminal waiting to play the to-be-coded media data.

The first quality parameter determining subunit 1333 is configured to: in response to that the device index information satisfies a parameter adjustment condition, determine, according to the device index information and the first coding quality parameter, a frame coding quality parameter corresponding to the first to-be-coded data frame, and determine, according to the device index information and the second coding quality parameter, a frame coding quality parameter corresponding to the second to-be-coded data frame.

For specific implementations of the coding frame obtaining subunit 1331, the device information obtaining subunit 1332, and the first quality parameter determining subunit 1333, refer to the descriptions of steps S103 and S104 in the corresponding embodiment in FIG. 3 above, and details will not be repeated here.

In an embodiment, the device index information includes a network quality parameter and decoding computing power information.

The quality parameter determining unit 133 may further include: a device information matching subunit 1334 and a condition determining subunit 1335.

The device information matching subunit 1334 is configured to match the network quality parameter with a network parameter threshold and match the decoding computing power information with a computing power threshold.

The condition determining subunit 1335 is configured to: determine, in response to that the network quality parameter is greater than a network parameter threshold and that the decoding computing power information is greater than a computing power threshold, that the device index information does not satisfy the parameter adjustment condition.

The condition determining subunit 1335 is also configured to: determine, in response to that the network quality parameter is less than the network parameter threshold and that the decoding computing power information is less than the computing power threshold, that the device index information satisfies the parameter adjustment condition.

For specific implementations of the device information matching subunit 1334 and the condition determining subunit 1335, refer to the descriptions of steps S103 and S104 in the corresponding embodiment in FIG. 3 above, and details will not be repeated here.

In an embodiment, the quality parameter determining unit 133 may further include: a second quality parameter determining subunit 1336.

The second quality parameter determining subunit 1336 is configured to: in response to that the device index information does not satisfy the parameter adjustment condition, determine the first coding quality parameter as the frame coding quality parameter corresponding to the first to-be-coded data frame, and determine the second coding quality parameter as the frame coding quality parameter corresponding to the second to-be-coded data frame.

For specific implementations of the second quality parameter determining subunit 1336, refer to the descriptions of steps S103 and S104 in the corresponding embodiment in FIG. 3 above, and details will not be repeated here.

In an embodiment, the first coding quality parameter includes a scenario code rate control parameter. The device index information includes a network quality parameter.

The first quality parameter determining subunit 1333 may also be configured to obtain a parameter mapping table, the parameter mapping table containing a mapping relationship between a network quality interval set and an adaptation code rate control parameter set, and a mapping relationship exists between one network quality interval and one adaptation code rate control parameter.

The first quality parameter determining subunit 1333 may also be configured to: obtain the network quality parameter corresponding to the first terminal, obtain, from the network quality interval set, a first network quality interval to which the network quality parameter belongs, and obtain a network adaptation code rate control parameter having a mapping relationship with the first network quality interval.

The first quality parameter determining subunit 1333 may also be configured to: determine, according to the scenario code rate control parameter and the network adaptation code rate control parameter, the frame coding quality parameter corresponding to the first to-be-coded data frame.

In an embodiment, the first quality parameter determining subunit 1333 may also be configured to obtain a first operational coefficient corresponding to the first service scenario type, and a second operational coefficient corresponding to the network quality parameter.

The first quality parameter determining subunit 1333 may also be configured to perform calculation on the first operational coefficient and the scenario code rate control parameter to obtain a first operation code rate control parameter.

The first quality parameter determining subunit 1333 may also be configured to perform calculation on the second operational coefficient and the network adaptation code rate control parameter to obtain a second operation code rate control parameter.

The first quality parameter determining subunit 1333 may also be configured to determine a mean value of the first operation code rate control parameter and the second operation code rate control parameter, and determine the mean value as the frame coding quality parameter corresponding to the first to-be-coded data frame.

In an embodiment, the first quality parameter determining subunit 1333 may also be configured to compare the scenario code rate control parameter with the network adaptation code rate control parameter to determine a minimum code rate control parameter from the scenario code rate control parameter and the network adaptation code rate control parameter.

The first quality parameter determining subunit 1333 may also be configured to determine the minimum code rate control parameter as the frame coding quality parameter corresponding to the first to-be-coded data frame.

In this embodiment of the present disclosure, different coding configuration templates can be configured for different service scenario types to generate a configuration template set. The configuration template set may include each service scenario type and its corresponding coding configuration template (with a mapping relationship). When the to-be-coded media data is obtained, the first coding configuration template corresponding to the first service scenario type can be quickly obtained from the configuration template set according to the first service scenario type to which the to-be-coded media data belongs. Then, the first coding configuration template can be appropriately adjusted according to a real-time network state (or the terminal decoding ability), and the frame coding parameter of the to-be-coded media data is finally determined; and the to-be-coded media data is coded according to the frame coding parameter to obtain first media data with first media quality matching the first service scenario type. That is, by configuring different coding configuration templates for different service scenario types in advance, the first coding configuration template corresponding to the first service scenario type can be found through querying during the coding, and the frame coding parameter of the to-be-coded media data can be quickly determined through the first coding configuration template and the network state (or the terminal decoding ability), which can effectively reduce the amount of computation and coding time in the coding process, and improve the coding efficiency for the to-be-coded media data. At the same time, according to the manner of adaptively selecting and adjusting a coding configuration template according to a service scenario type and a network state (or terminal decoding ability), the determined first coding configuration template will match the first service scenario type and the network state, and the first media quality of the coded first media data matches the first service scenario type and the network state, that is, the frame coding parameter determined on the basis of the first coding configuration template meets the coding requirements of the first service scenario type, has scenario adaptability, and also meets a demand for a network state. The compression performance of the first media data obtained by using the frame coding parameter is also high. In conclusion, the present disclosure can improve the coding efficiency of a computer device and improve the code compression performance.

Figure 9:
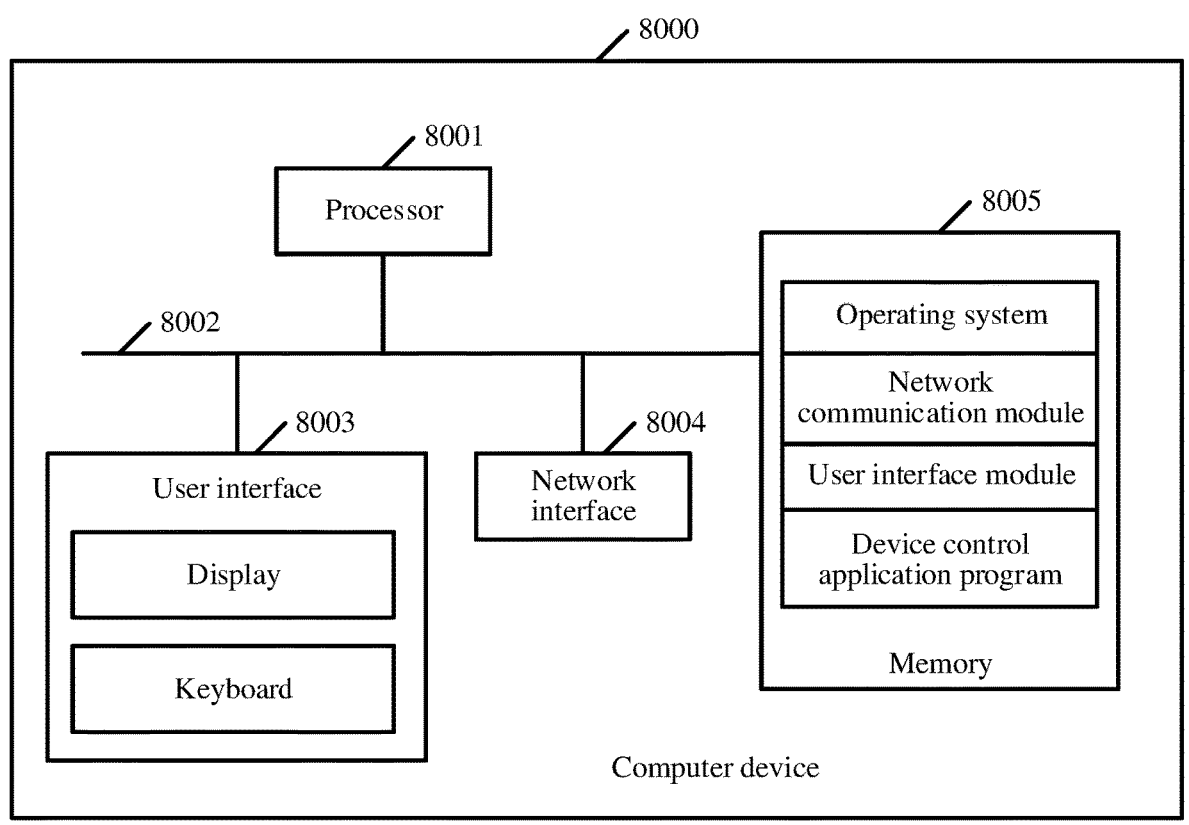
FIG. 9 is a schematic structural diagram of a computer device according to an embodiment of the present disclosure.

Further, referring to FIG. 9, FIG. 9 is a schematic structural diagram of a computer device according to an embodiment of the present disclosure. As shown in FIG. 9, the apparatus 1 in the corresponding embodiment in FIG. 7 above may be applied to the above computer device 8000. The above computer device 8000 may include: a processor 8001, a network interface 8004, and a memory 8005. In addition, the above computer device 8000 may further include: a user interface 8003 and at least one communication bus 8002. The communication bus 8002 is used for realizing connection and communication between these components. The user interface 8003 may include a display and a keyboard. In some embodiments, the user interface 8003 may further include a standard wired interface and wireless interface. The network interface 8004 may optionally include a standard wired interface and a standard wireless interface (such as a WI-FI interface). The memory 8005 may be either a high-speed random access memory (RAM) or a non-volatile memory, for example, at least one disk memory. The memory 8005 may optionally be at least one memory apparatus located far away from the aforementioned processor 8001. As shown in FIG. 9, the memory 8005, as a computer-readable storage medium, may include an operating system, a network communication module, a user interface module, and a device control application program.

In the computer device 8000 shown in FIG. 9, the network interface 8004 may provide a network communication function. The user interface 8003 is mainly used for providing an interface for a user to type. The processor 8001 may be configured to invoke a device control application program stored in the memory 8005, and implement:

obtaining to-be-coded media data and a first service scenario type to which the to-be-coded media data belongs;

obtaining, according to mapping relationships between at least two coding configuration templates in a configuration template set and at least two service scenario types, a first coding configuration template corresponding to the first service scenario type; a mapping relationship existing between one coding configuration template and one service scenario type, and the at least two coding configuration templates including the first coding configuration template; and determining a frame coding parameter of the to-be-coded media data according to the first coding configuration template, and coding the to-be-coded media data according to the frame coding parameter to obtain first media data with first media quality. The first media quality matches the first service scenario type.

It is understood that the computer device 8000 described in the embodiments of the present disclosure may implement the descriptions of the data processing method in the corresponding embodiments in FIG. 3 to FIG. 7 above, or may implement the description of the data processing apparatus 1 in the corresponding embodiment in FIG. 8 above. Details will not be repeated here. In addition, the description of beneficial effects of the same method are not described here again.

In addition, it is noted that: the embodiments of the present disclosure further provide a computer-readable storage medium. The computer-readable storage medium stores a computer program executed by the aforementioned computer device 1000 for data processing, and the computer program includes program instructions which, when executed by the above processor, can implement the description of the data processing method in the corresponding embodiments in FIG. 3 to FIG. 7. Details will not be repeated here. In addition, the description of beneficial effects of the same method are not described here again. For technical details not disclosed in this embodiment of the computer-readable storage medium in the present disclosure, refer to the description of the method embodiment of the present disclosure.

The computer-readable storage medium may be the data processing apparatus provided in any of the aforementioned embodiments or an internal storage unit of the computer device, for example, a hard disk or an internal memory of the computer device. The computer-readable storage medium may also be an external storage device of the computer device, for example, a plug-in hard disk, a smart media card (SMC), a secure digital (SD) card, a flash card, and the like provided on the computer device. Further, the computer-readable storage medium may also include both an internal storage unit and an external storage device of the computer device. The computer-readable storage medium is configured to store the computer program and other programs and data required by the computer device. The computer-readable storage medium may also be configured to temporarily store data that has been or is about to be output.

One aspect of the present disclosure provides a computer program product or a computer program, including computer instructions stored in a computer-readable storage medium. A processor of the computer device reads the computer instructions from the computer-readable storage medium, and executes the computer instructions, so that the computer device implements the method provided in one aspect of the embodiments of the present disclosure.

The terms such as "first", "second", and the like in this specification, claims, and the accompanying drawings of the embodiments of the present disclosure are used to distinguish different objects and are not used to describe a specific sequence. In addition, the terms "include" and any variant thereof are intended to cover a non-exclusive inclusion. For example, a process, method, apparatus, product, or device that includes a series of steps or modules is not limited to the listed steps or modules; and instead, further optionally includes a step or module that is not listed, or further optionally includes another step or unit that is intrinsic to the process, method, apparatus, product, or device.

A person of ordinary skill in the art may understand that, units and algorithm steps of the examples described in the foregoing embodiments disclosed here may be implemented by electronic hardware, computer software, or a combination thereof. To clearly describe the interchangeability between the hardware and the software, the foregoing has generally described compositions and steps of each example based on functions. Whether these functions are implemented as hardware or software depends on particular application and design constraint conditions of the technical solutions. A person skilled in the art may use different methods to implement the described functions for each particular application, but it should not be considered that the implementation goes beyond the scope of the present disclosure.

The method and related apparatus provided in the embodiments of the present disclosure are described with reference to the method flowchart and/or schematic structural diagram provided in the embodiments of the present disclosure. Specifically, each flow and/or block in the method flowchart and/or structural diagram, as well as a combination of flows and/or blocks in the flowchart and/or block diagram, can be implemented by computer program instructions. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more flows in the flowcharts and/or in one or more blocks in the schematic structural diagrams. These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more flows in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more flows in the flowcharts and/or in one or more blocks in the schematic structural diagrams.

The above describes only preferred embodiments of the present disclosure and are not, of course, intended to limit the scope of the present disclosure, so that equivalent changes made according to the claims of the present disclosure still fall within the scope of the present disclosure.

What is claimed is:

1. A data processing method, performed in a computer device and comprising:
    obtaining media data to be coded and a first service scenario type to which the media data belongs;
    obtaining, according to mapping relationships between at least two coding configuration templates in a configuration template set and at least two service scenario types, a first coding configuration template corresponding to the first service scenario type;
    determining a frame coding structure corresponding to the media data, wherein the frame coding structure is a layered coding structure, and the layered coding structure comprises a plurality of data frames at different layers;
    obtaining a coding quality parameter in the first coding configuration template;
    obtaining device index information of a first terminal, the first terminal referring to a terminal waiting to play the media data, the device index information comprising a network quality parameter and a decoding computing power of the first terminal;
    performing quality parameter configuration on the media data according to the coding quality parameter to obtain a frame coding quality parameter of the media data, the frame coding quality parameter of the media data comprising frame coding quality parameters corresponding to the plurality of data frames at the different layers, comprising:
    in response to that the network quality parameter and the decoding computing power satisfy a parameter adjustment condition, adjusting, according to the device index information and the coding quality parameter, the frame coding quality parameter of the media data; and
    coding the media data according to the frame coding parameter of the media data to obtain first media data for the first terminal.

2. The method according to claim 1, wherein the obtaining, according to mapping relationships between at least two coding configuration templates in a configuration template set and at least two service scenario types, a first coding configuration template corresponding to the first service scenario type comprises:
    traversing the at least two service scenario types in the configuration template set;
    determining, from the at least two coding configuration templates in response to that the at least two service scenario types comprise a service scenario type identical with the first service scenario type, that a coding configuration template having a mapping relationship with the first service scenario type is the first coding configuration template corresponding to the first service scenario type; and
    determining, in response to that the at least two service scenario types do not comprise a service scenario type identical with the first service scenario type, scenario similarities between the at least two service scenario types and the first service scenario type, and determining the first coding configuration template corresponding to the first service scenario type according to the at least two scenario similarities.

3. The method according to claim 2, wherein the determining the first coding configuration template corresponding to the first service scenario type according to the at least two scenario similarities comprises:
    obtaining a maximum scenario similarity from the at least two scenario similarities, and comparing the maximum scenario similarity with a scenario similarity threshold; and
    determining, from the at least two service scenario types in response to that the maximum scenario similarity is greater than the scenario similarity threshold, a service scenario type corresponding to the maximum scenario similarity as a matching service scenario type, and determining, from the at least two coding configuration templates, a coding configuration template having a mapping relationship with the matching service scenario type as the first coding configuration template corresponding to the first service scenario type.

4. The method according to claim 1, wherein determining the frame coding structure corresponding to the media data comprises:
    obtaining a frame type distribution and a frame level distribution in the first coding configuration template;
    determining, according to the frame type distribution and the frame level distribution, the frame coding structure corresponding to the media data.

5. The method according to claim 4, wherein the determining, according to the frame type distribution and the frame level distribution, a frame coding structure corresponding to the media data comprises:

obtaining a unit data frame group in the media data, the unit data frame group being composed of N continuous data frames, and N being a positive integer;

performing type division on the data frames in the unit data frame group according to the frame type distribution to obtain data frames after the type division;

performing level division on the data frames after the type division according to the frame level distribution to obtain the layered coding structure corresponding to the unit data frame group; and determining, according to the layered coding structure corresponding to the unit data frame group, the frame coding structure corresponding to the media data.

6. The method according to claim 4, wherein the layered coding structure comprises a first level and a second level; the second level is higher than the first level; the coding quality parameter comprises a first coding quality parameter corresponding to the first level, and a second coding quality parameter corresponding to the second level; and the performing quality parameter configuration on the media data according to the coding quality parameter to obtain a frame coding quality parameter corresponding to the media data comprises:

obtaining, from the media data, a first data frame at the first level in the layered coding structure and a second data frame at the second level in the layered coding structure;

in response to that the device index information satisfies the parameter adjustment condition, determining, according to the device index information and the first coding quality parameter, a frame coding quality parameter corresponding to the first data frame, and determining, according to the device index information and the second coding quality parameter, a frame coding quality parameter corresponding to the second data frame.

7. The method according to claim 6, wherein the method further comprises:

determining, in response to that the network quality parameter is greater than a network parameter threshold and that the decoding computing power information is greater than a computing power threshold, that the device index information does not satisfy the parameter adjustment condition; and determining, in response to that the network quality parameter is less than the network parameter threshold and that the decoding computing power information is less than the computing power threshold, that the device index information satisfies the parameter adjustment condition.

8. The method according to claim 6, further comprising:
in response to that the device index information does not satisfy the parameter adjustment condition, determining the first coding quality parameter as the frame coding quality parameter corresponding to the first data frame, and determining the second coding quality parameter as the frame coding quality parameter corresponding to the second data frame.

9. The method according to claim 6, wherein the first coding quality parameter comprises a scenario code rate control parameter; the device index information comprises the network quality parameter; and the determining, according to the device index information and the first coding quality parameter, a frame coding quality parameter corresponding to the first data frame comprises:

obtaining a parameter mapping table, the parameter mapping table containing a mapping relationship between a network quality interval set and an adaptation code rate control parameter set;

obtaining the network quality parameter corresponding to the first terminal, obtaining, from the network quality interval set, a first network quality interval to which the network quality parameter belongs, and obtaining a network adaptation code rate control parameter having a mapping relationship with the first network quality interval; and determining, according to the scenario code rate control parameter and the network adaptation code rate control parameter, the frame coding quality parameter corresponding to the first data frame.

10. The method according to claim 9, wherein the determining, according to the scenario code rate control parameter and the network adaptation code rate control parameter, the frame coding quality parameter corresponding to the first data frame comprises:

obtaining a first operational coefficient corresponding to the first service scenario type, and a second operational coefficient corresponding to the network quality parameter;

performing calculation on the first operational coefficient and the scenario code rate control parameter to obtain a first operation code rate control parameter;

performing calculation on the second operational coefficient and the network adaptation code rate control parameter to obtain a second operation code rate control parameter; and determining a mean value of the first operation code rate control parameter and the second operation code rate control parameter, and determining the mean value as the frame coding quality parameter corresponding to the first data frame.

11. The method according to claim 9, wherein the determining, according to the scenario code rate control parameter and the network adaptation code rate control parameter, the frame coding quality parameter corresponding to the first data frame comprises:

determining a minimum code rate control parameter between the scenario code rate control parameter and the network adaptation code rate control parameter; and determining the minimum code rate control parameter as the frame coding quality parameter corresponding to the first data frame.

12. The method according to claim 1, wherein a mapping relationship exists between one coding configuration template and one service scenario type; the at least two coding configuration templates comprise the first coding configuration template;

the first media data has first media quality; and the first media quality corresponds to the first service scenario type.

13. The method according to claim 1, wherein the frame coding quality parameter of the media data is adjusted in real time based on the device index information of the first terminal and the parameter adjustment condition.

14. The method according to claim 1, wherein adjusting the frame coding parameter of the media data comprises at least one of:

adjusting a quantity of the layers of the layered coding structure in the template configuration;

adjusting a quantity of frames in the different layers; or adjusting the frame coding quality parameters of the different layers.

15. A data processing apparatus, comprising:
at least one processor and at least one memory,
the at least one memory being configured to store program codes, and the at least one processor being configured to invoke the program codes to cause the computer device to implement:
obtaining media data to be coded and a first service scenario type to which the media data belongs;
obtaining, according to mapping relationships between at least two coding configuration templates in a configuration template set and at least two service scenario types, a first coding configuration template corresponding to the first service scenario type;
determining a frame coding structure corresponding to the media data, wherein the frame coding structure is a layered coding structure, and the layered coding structure comprises a plurality of data frames at different layers;
obtaining a coding quality parameter in the first coding configuration template;
obtaining device index information of a first terminal, the first terminal referring to a terminal waiting to play the media data, the device index information comprising a network quality parameter and a decoding computing power of the first terminal;
performing quality parameter configuration on the media data according to the coding quality parameter to obtain a frame coding quality parameter of the media data, the frame coding quality parameter of the media data comprising frame coding quality parameters corresponding to the plurality of data frames at the different layers, comprising:
in response to that the network quality parameter and the decoding computing power satisfy a parameter adjustment condition, adjusting, according to the device index information and the coding quality parameter, the frame coding quality parameter of the media data; and
coding the media data according to the frame coding parameter of the media data to obtain first media data for the first terminal.

16. The apparatus according to claim 15, wherein the obtaining, according to mapping relationships between at least two coding configuration templates in a configuration template set and at least two service scenario types, a first coding configuration template corresponding to the first service scenario type comprises:
traversing the at least two service scenario types in the configuration template set;
determining, from the at least two coding configuration templates in response to that the at least two service scenario types comprise a service scenario type identical with the first service scenario type, that a coding configuration template having a mapping relationship with the first service scenario type is the first coding configuration template corresponding to the first service scenario type; and
determining, in response to that the at least two service scenario types do not comprise a service scenario type identical with the first service scenario type, scenario similarities between the at least two service scenario types and the first service scenario type, and determining the first coding configuration template corresponding to the first service scenario type according to the at least two scenario similarities.

17. The apparatus according to claim 16, wherein the determining the first coding configuration template corresponding to the first service scenario type according to the at least two scenario similarities comprises:
obtaining a maximum scenario similarity from the at least two scenario similarities, and comparing the maximum scenario similarity with a scenario similarity threshold; and
determining, from the at least two service scenario types in response to that the maximum scenario similarity is greater than the scenario similarity threshold, a service scenario type corresponding to the maximum scenario similarity as a matching service scenario type, and determining, from the at least two coding configuration templates, a coding configuration template having a mapping relationship with the matching service scenario type as the first coding configuration template corresponding to the first service scenario type.

18. The apparatus according to claim 15, wherein determining the frame coding structure corresponding to the media data comprises:
obtaining a frame type distribution and a frame level distribution in the first coding configuration template;
determining, according to the frame type distribution and the frame level distribution, the frame coding structure corresponding to the media data.

19. The apparatus according to claim 18, wherein the determining, according to the frame type distribution and the frame level distribution, a frame coding structure corresponding to the media data comprises:
obtaining a unit data frame group in the media data, the unit data frame group being composed of N continuous data frames, and N being a positive integer;
performing type division on the data frames in the unit data frame group according to the frame type distribution to obtain data frames after type division;
performing level division on the data frames after type division according to the frame level distribution to obtain the layered coding structure corresponding to the unit data frame group; and
determining, according to the layered coding structure corresponding to the unit data frame group, the frame coding structure corresponding to the media data.

20. A non-transitory computer-readable storage medium, the computer-readable storage medium storing a computer program, and the computer program being executed by at least one processor to implement:
obtaining media data to be coded and a first service scenario type to which the media data belongs;
obtaining, according to mapping relationships between at least two coding configuration templates in a configuration template set and at least two service scenario types, a first coding configuration template corresponding to the first service scenario type;
determining a frame coding structure corresponding to the media data, wherein the frame coding structure is a layered coding structure, and the layered coding structure comprises a plurality of data frames at different layers;
obtaining a coding quality parameter in the first coding configuration template;
obtaining device index information of a first terminal, the first terminal referring to a terminal waiting to play the media data, the device index information comprising a network quality parameter and a decoding computing power of the first terminal;
performing quality parameter configuration on the media data according to the coding quality parameter to obtain a frame coding quality parameter of the media data, the frame coding quality parameter of the media data comprising frame coding quality parameters corresponding to the plurality of data frames at the different layers, comprising:
  in response to that the network quality parameter and the decoding computing power satisfy a parameter adjustment condition, adjusting, according to the device index information and the coding quality parameter, the frame coding quality parameter of the media data; and
coding the media data according to the determined frame coding parameter of the media data to obtain first media data for the first terminal.

* * * * *